United States Patent

Fujiwara et al.

[11] Patent Number: 5,887,844
[45] Date of Patent: Mar. 30, 1999

[54] FLUID-SEALED VIBRATION ISOLATING DEVICE

[75] Inventors: Yoshinari Fujiwara; Shingo Hatakeyama, both of Chiba, Japan

[73] Assignee: Kinugawa Rubber Ind. Co., Ltd., Chiba, Japan

[21] Appl. No.: 903,386

[22] Filed: Jul. 30, 1997

[30] Foreign Application Priority Data

Jul. 31, 1996 [JP] Japan .................................... 8-201392

[51] Int. Cl.$^6$ .................................................. F16M 13/00
[52] U.S. Cl. ........................................ 248/562; 267/140.1
[58] Field of Search ...................................... 248/562, 636, 248/638; 267/140.1

[56] References Cited

U.S. PATENT DOCUMENTS

| | | | |
|---|---|---|---|
| 4,693,456 | 9/1987 | Kanda .................................. | 267/140.1 |
| 4,708,329 | 11/1987 | Tabata et al. ......................... | 267/140.1 |
| 4,895,353 | 1/1990 | Roth et al. ............................ | 267/140.1 |
| 5,040,774 | 8/1991 | Veverka et al. ...................... | 267/140.1 |
| 5,188,346 | 2/1993 | Hamada et al. ..................... | 267/140.12 |
| 5,213,313 | 5/1993 | Tsutsumida et al. ............... | 267/140.12 |
| 5,333,847 | 8/1994 | Kanda ................................. | 267/140.12 |
| 5,547,173 | 8/1996 | Tsutsumida et al. .............. | 267/140.15 |

FOREIGN PATENT DOCUMENTS 5-280576 10/1993 Japan .

*Primary Examiner*—Leslie A. Braun
*Assistant Examiner*—Anita M. King
*Attorney, Agent, or Firm*—Foley & Lardner

[57] ABSTRACT

A fluid-sealed vibration isolating device comprises primary and secondary damping-fluid chambers, a fluid-flow restrictive plate or diaphragm for dividing the primary damping-fluid chamber into first and second main chambers and being responsive to an amplitude of input vibration for restricting a flow of damping fluid between the first and second main chambers when the amplitude of input vibration is greater than a predetermined amplitude, the secondary damping-fluid chamber including first and second sub-chambers, and first, second and third orifice passageways for defining respective flow restrictive passages between the first main chamber and the first sub-chamber, between the second main chamber and the first sub-chamber, and between the second main chamber and the second sub-chamber. The fluid-flow restrictive plate or diaphragm associated with the second and third orifice passageways for creating at least three resonant vibration systems required to damp three different input vibrations including engine shake, idling vibration, and high-frequency vibrations.

6 Claims, 17 Drawing Sheets

FLUID-SEALED VIBRATION ISOLATING DEVICE

BACKGROUND OF THE INVENTION

1. Field of the Invention

The present invention relates to a fluid-sealed vibro-isolating device which is suitable for an engine mount for automotive vehicles, and particularly to a fluid-sealed vibro-isolating device which is capable of effectively reducing or attentuating undesired vibrations, ranging in several kinds of frequency ranges.

2. Description of the Prior Art

As is generally known in the design of engine mountings, an internal combustion engine produces various kinds of vibrations or different vibration frequencies, ranging within a wide frequency range. When vibrating at low frequencies, ranging from 5 to 20 Hz (particularly close to 10 Hz), so-called "engine shake" may be excited by oscillatory hopping motion of wheels. During engine idling, the vibration frequency for the idle speed would be 20–'Hz or 25–50 Hz. When the engine frequency reaches a comparatively high frequency range of 80–200 Hz or 50–300 Hz, a high intensity vibration often called "booming noise" may be perceived audibly and also the acceleration period vibrations or noises may occur. As may be appreciated from the above, the so-called "engine shake" corresponding to low or intermediate frequency (5–20 Hz) vibrations involves relatively large amplitudes, whereas the so-called body-boom noise corresponding to high intensity vibration (50–200 Hz) involves relatively small amplitudes. The conflict between the high damping required for "engine shake" isolation and the low damping for dealing with noise has led to fluid-sealed vibration isolating mounts. One such fluid-sealed vibration isolating mount has been disclosed in Japanese Patent Provisional Publication No. 5-280576, assigned to the assignee of the present invention. FIG. 23 shows a simplified model of a vibrating system equivalent to the fluid-sealed vibration isolating device disclosed in the Japanese Patent Provisional Publication No. 5-280576. Hereinafter discussed is the detailed structure of the prior art vibration isolating device by reference to the simplified vibration model shown in FIG. 23.

Referring now to FIG. 23, in the conventional fluid-sealed vibro-isolating device, a primary damping-fluid chamber 1 of an expansion-phase elasticity $K_1$ is communicated with a secondary damping-fluid chamber 2 of an expansion-phase elasticity $K_2$ through two different fixed orifices, namely a first orifice 3 of a large equivalent mass and a second orifice 4 of a small equivalent mass. Also provided near the opening of the second orifice 4 is a fluid-flow restriction plate 5 for restricting the fluid flow from the primary chamber 1 to the secondary chamber 2 via the second orifice 4 when vibrating with an amplitude greater than a predetermined threshold value. In FIG. 23, K denotes an elasticity or a spring stiffness of the elastomeric rubber unit incorporated in the device. When large amplitude input vibrations such as "engine shake", that is, low or intermediate vibration frequencies (5–20 Hz) are transmitted from a vibrating body (engine) to the vibration isolating device (the vibrating system), the fluid flow passing through the second orifice 4 is effectively restricted by means of the flow restriction plate 5, since the amplitude of the input vibrations exceeds the predetermined threshold. As a result, only the first orifice 3 permits damping fluid flow between the primary and secondary chambers 1 and 2, while properly restricting the fluid flow therethrough. In the case that small-amplitude input vibrations such as idling vibration of the engine, that is, intermediate or high vibration frequencies (20–40 Hz or 25–50 Hz) are transmitted from the vibrating body (engine) to the vibration isolating device, the fluid communication between the primary and secondary chambers 1 and 2 is established by means of the two orifices 3 and 4, since there is no fluid-flow restriction of the restriction plate 5 owing to the amplitude of the input vibration less than the predetermined threshold. Therefore, in case of application of large-amplitude input vibration of low or intermediate frequencies, for example "engine shaking", such large-amplitude input vibration can be effectively reduced by way of liquid-column resonance of damping fluid within the first orifice 3 of the large equivalent mass. Alternatively, in case of application of small-amplitude input vibration of intermediate or high frequencies, for example idling vibration, such small-amplitude input vibration can be effectively reduced by way of total liquid-column resonance of damping fluid within both the first and second orifices 3 and 4. It is well known to set a loss factor at a great value for effectively damping low- or intermediate-frequency, large-amplitude vibrations, such as "engine shake", and to set a dynamic spring stiffness of the vibration isolating device (the vibro-isolating mount) at a small dynamic spring stiffness for effectively damping intermediate- or high-frequency, small-amplitude vibrations, such as "idling vibration of the engine". The Japanese Patent Provisional Publication No. 5-280576, teaches the use of the fluid-flow restriction plate 5 which is responsive to the amplitude of input vibrations for properly varying a combined equivalent mass of the first and second orifices 3 and 4, so that a great loss factor can be achieved in the presence of low- or intermediate frequency, large-amplitude vibrations (engine shaking, 5–20 Hz) and so that a small dynamic spring stiffness can be achieved in the presence of intermediate- or high-frequency, small-amplitude vibrations (idling vibrations, 20–40 Hz). In the prior art vibration isolating device discussed above, the size of the opening of the second orifice 4 can be adjusted to the minimum (a fully closed state) by means of the restriction plate 5 only when the large-amplitude input vibrations are transmitted to the device. Thus, it is possible to effectively reduce both low- or intermediate-frequency, large-amplitude vibrations (e.g., engine shake, approximately 10 Hz) and low- or intermediate-frequency, small-amplitude vibrations (e.g., idling vibration, 20–40 Hz). However, in the prior art device, there is a tendency for a dynamic spring stiffness (or a dynamic spring constant) to rapidly increase when the frequency of input vibration becomes higher than 40 Hz. The undesiredly increased dynamic spring stiffness of the device results in the lowering of vibration isolating performance with respect to input vibrations included in a high-intensity vibration range (boom noise) or a high-frequency vibration range (acceleration period noise), such as 50–300 Hz.

During driving on paved roads, the engine would experience a different kind of input vibration such as a low- or intermediate-frequency, small-amplitude vibration. The use of the flow-restriction plate 5 is effective to prevent or permit the flow of damping fluid passing through the second orifice 4 and consequently to damp engine shaking of a large amplitude or to damp the vibration caused by engine idling. However, the prior art device set out above cannot satisfactorily reduce the low- or intermediate-frequency, small-amplitude vibrations caused by paved-road running.

SUMMARY OF THE INVENTION

Accordingly, it is an object of the invention to provide a fluid-sealed vibration isolating device which avoids the aforementioned disadvantages of the prior art.

It is another object of the invention to provide a fluid-sealed vibration isolating device which is capable of effectively reducing high-intensity input vibrations (booming noise) and high-frequency input vibrations (acceleration-period noise), 50–300 Hz, in addition to low- or intermediate-frequency, large-amplitude input vibrations (engine shake, 5–20 Hz) and intermediate- or high-frequency, small-amplitude input vibrations (idling vibration, 20–40 Hz).

It is a further object of the invention to provide a fluid-sealed vibration isolating device which is capable of effectively reducing high-intensity input vibrations (booming noise), high-frequency input vibrations (acceleration-period noise), 50–300 Hz, and low- or intermediate-frequency, small-amplitude input vibrations (caused by paved-road running) in addition to low- or intermediate-frequency, large-amplitude input vibrations (engine shake, 5–20 Hz) and intermediate- or high-frequency, small-amplitude input vibrations (idling vibration, 20–40 Hz).

In order to accomplish the aforementioned and other objects of the present invention, a fluid-sealed vibration isolating device comprises primary and secondary damping-fluid chambers having respective individual expansion-phase elasticities, a fluid-flow restrictive means for dividing the primary damping-fluid chamber into a first main chamber disposed in a side of a member which vibrates and having a first expansion-phase elasticity and a second main chamber disposed in the opposite side, and being responsive to an amplitude of input vibration for restricting a flow of damping fluid between the first and second main chambers when the amplitude of input vibration is greater than a predetermined amplitude, the secondary damping-fluid chamber including a first sub-chamber having a second expansion-phase elasticity and a second sub-chamber having a third expansion-phase elasticity, a first orifice passageway means for defining a flow restrictive passage between the first main chamber and the first sub-chamber, a second orifice passageway means for defining a flow restrictive passage between the second main chamber and the first sub-chamber, and a third orifice passageway means for defining a flow restrictive passage between the second main chamber and the second sub-chamber, wherein the fluid-flow restrictive means associated with the second and third orifice passageway means for creating at least three resonant vibration systems required to damp three different input vibrations including an engine shake, an idling vibration, and a high-frequency vibration. The fluid-flow restrictive means may comprise a fluid-flow restriction plate restricting a flow of damping fluid passing through each of the second and third orifice passageway means when the amplitude of input vibration exceeds the predetermined amplitude. Preferably, the second expansion-phase elasticity of the first sub-chamber may be set at a small value and the third expansion-phase elasticity ($K_3$) of the second sub-chamber (19) may be set to be greater that the second expansion-phase elasticity ($K_2$) of the first sub-chamber (18). A given equivalent mass of the first orifice passageway means may be set at a great value, a given equivalent mass of the second orifice passageway means may be set to be less than the given equivalent mass of the first orifice passageway means, and a given equivalent mass of the third orifice passageway means may be set to be less than a combined equivalent mass of the first and second orifice passageway means. The fluid-sealed vibration isolating device may further comprise a cylindrical outer collar adapted to be connected with one of a vibrating body (engine) and a base (chassis), an cylindrical inner collar adapted to be connected with the other, an intermediate orifice member interposed between the outer and inner collars and an elastomeric rubber body tightly interposed between the inner collar and at least one of the intermediate orifice member and the outer collar.

Accordingly to another aspect of the invention, a fluid-sealed vibration isolating device comprises primary and secondary damping-fluid chambers having respective individual expansion-phase elasticities, a fluid-flow restrictive means for dividing the primary damping-fluid chamber into a first main chamber disposed in a side of a member which vibrates and having a first expansion-phase elasticity and a second main chamber disposed in the opposite side, and being responsive to an amplitude of input vibration for restricting a flow of damping fluid between the first and second main chambers when the amplitude of input vibration is greater than a predetermined amplitude, the fluid-flow restrictive means including an elastic diaphragm unit of a non-linear spring-stiffness characteristic according to which the elastic diaphragm unit exhibits a spring stiffness within a small-amplitude input vibration range, the secondary damping-fluid chamber including a first sub-chamber having a second expansion-phase elasticity and a second sub-chamber having a third expansion-phase elasticity, a first orifice passageway means for defining a flow restrictive passage between the first main chamber and the first sub-chamber, a second orifice passageway means for defining a flow restrictive passage between the second main chamber and the first sub-chamber, and a third orifice passageway means for defining a flow restrictive passage between the second main chamber and the second sub-chamber, wherein the fluid-flow restrictive means associated with the second and third orifice passageway means for creating four resonant vibration systems required to damp four different input vibrations including an engine shake, an input vibration during paved-road running, an idling vibration, and a high-frequency vibration, wherein a resonance frequency of a large-amplitude period resonant vibration system including the first expansion-phase elasticity of the first main chamber, the second expansion-phase elasticity of the first sub-chamber and a given equivalent mass of the first orifice passageway means is set at a frequency included within an input-vibration frequency range equivalent to the engine shake, wherein a resonance frequency of a first small-amplitude period resonant vibration system including the first expansion-phase elasticity of the first main chamber, the second expansion-phase elasticity of the first sub-chamber, the spring stiffness of the elastic diaphragm unit and the given equivalent mass of the first orifice passageway means is set at a frequency included within an input-vibration frequency range equivalent to the input vibration during paved-road running, wherein a resonance frequency of a second small-amplitude period resonant vibration system including the first expansion-phase elasticity of the first main chamber, the second expansion-phase elasticity of the first sub-chamber, the spring stiffness of the elastic diaphragm unit and the given equivalent mass of the second orifice passageway means is set at a frequency included within an input-vibration frequency range equivalent to the idling vibration, and wherein a resonance frequency of a third small-amplitude period resonant vibration system including the first expansion-phase elasticity of the first main chamber, the third expansion-phase elasticity of the second sub-chamber, the spring stiffness of the elastic diaphragm unit and the given equivalent mass of the third orifice passageway means is set at a frequency included within an input-vibration frequency range equivalent to the high-frequency vibration containing becoming-noise and input vibrations during acceleration. The elastic diaphragm unit may comprise a circular central thick-walled high-rigidity section, an annular intermediate thin-walled low-rigidity section and a cylindrical outermost flanged section formed integral with each other to form an elastic diaphragm, and a support member securely holding the cylindrical outermost flanged section and having two opposing elastic-deformation restrictive walls spaced apart from the annular intermediate thin-walled low-rigidity section a predetermined space for permitting elastic deformation of the elastic diaphragm when the amplitude of input vibration is less than the predetermined amplitude, and restricting elastic deformation of the elastic diaphragm when the amplitude of input vibration exceeds the predetermined amplitude.

DESCRIPTION OF THE PREFERRED EMBODIMENTS

First Embodiment

Figure 1:
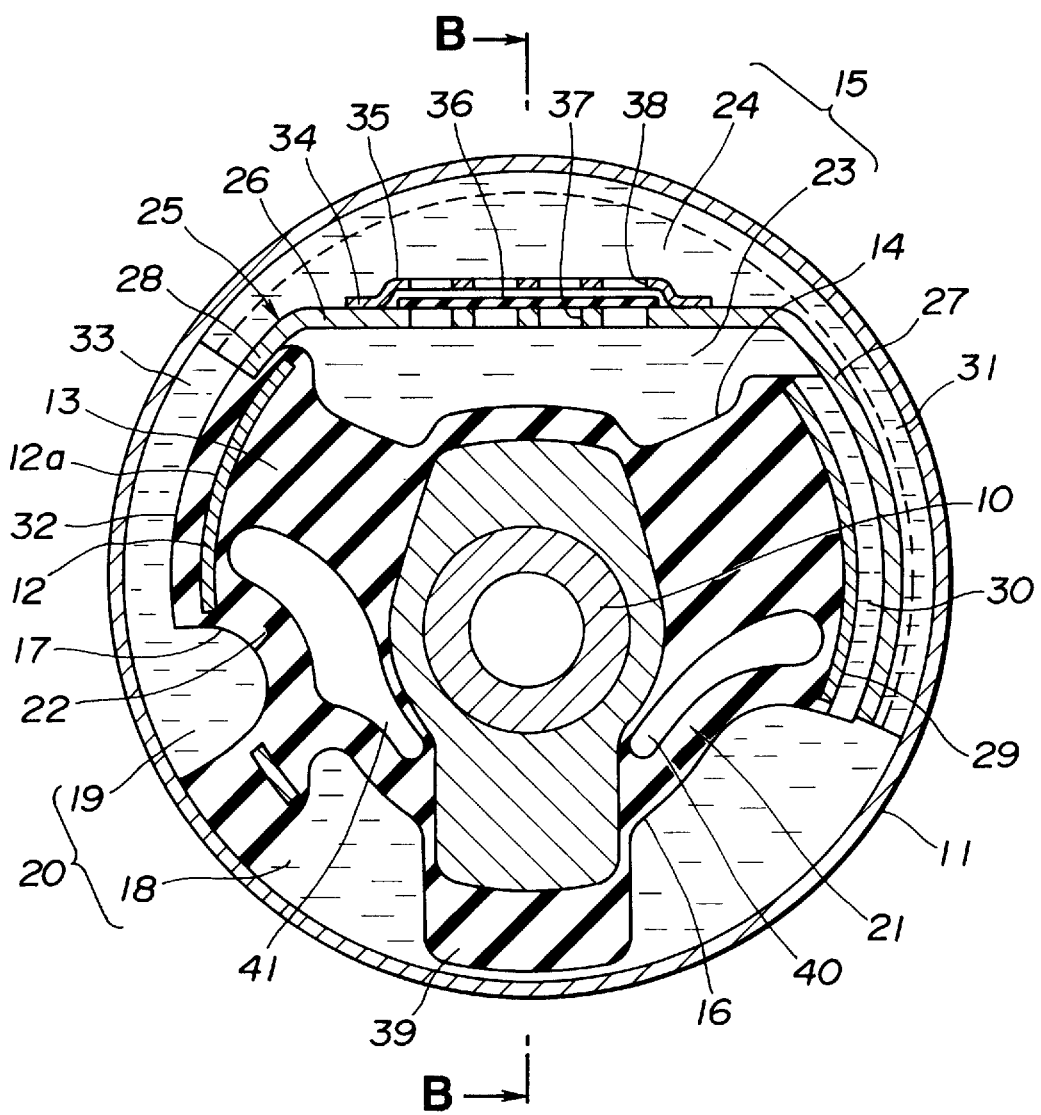
FIG. 1 is a cross section taken along the line A—A of FIG. 2, illustrating a first embodiment of a fluid-sealed vibration isolating device of the present invention.
Figure 2:
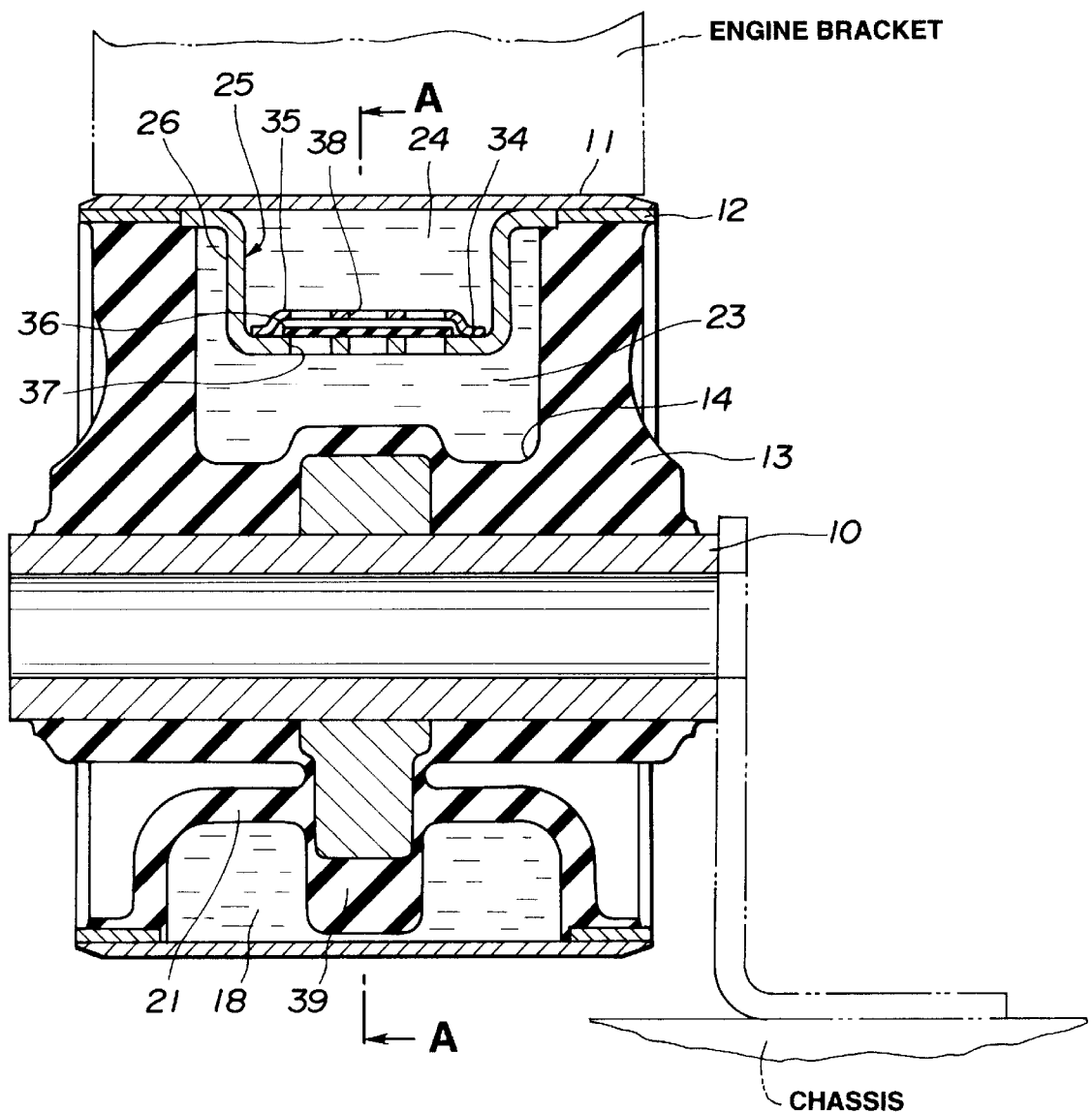
FIG. 2 is a cross section taken along the line B—B of FIG. 1.
Figure 3:
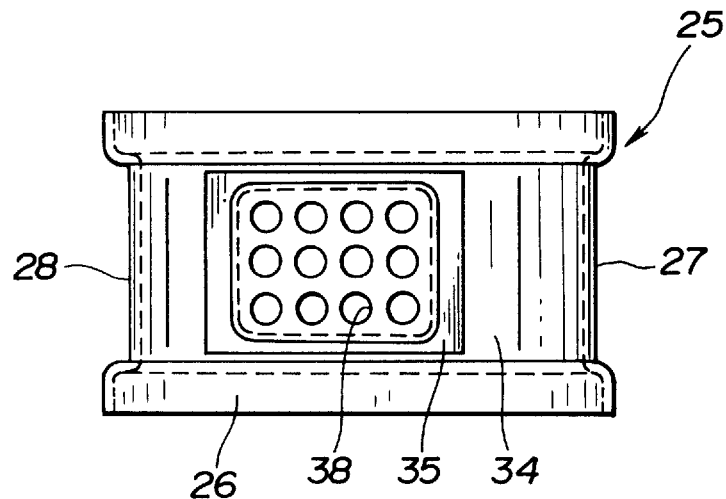
FIG. 3 is a top view illustrating a component part employed in the vibration isolating device of the first embodiment.
Figure 4:
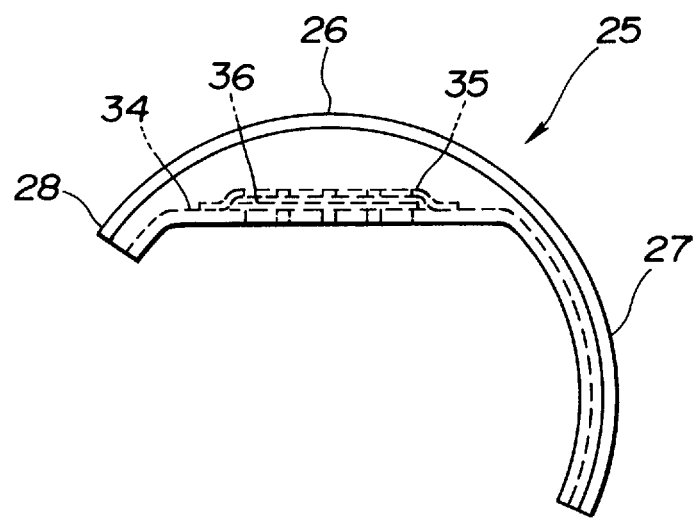
FIG. 4 is a side view of the same component part as shown in FIG. 3.

Referring now to the drawings, particularly to FIGS. 1 through 4, the fluid-sealed vibration isolating device of the first embodiment includes an inner collar 10 (an inner cylinder), usually both ends being fixedly connected through a chassis bracket to a chassis (a vehicle body) by way of retainer bolts (not shown), and an outer collar 11 (an outer cylinder) on which the engine is supported through an engine bracket. An intermediate cylindrical member (an intermediate cylinder) 12, partly opened, is press-fitted to the inner periphery of the outer collar 11. The outer collar 11 and the intermediate cylinder 12 are bonded to the inner collar 10 by means of an elastomeric rubber body (or an elastic rubber body) 13 to form a rubber-to-metal bonded unit. Incompressible damping fluid such as ethylene glycol or the like is filled into an internal space defined between the inner peripheral wall of the outer collar 11 and the outer peripheral wall of the elastomeric rubber body 13. The intermediate cylinder 12 is formed into a complicated shape such that its axial central portion is small-sized in diameter and such that a proper orifice passageway is defined around the outer periphery of the small-diameter portion 12a (see FIG. 1) of the intermediate cylinder 12. As seen in FIGS. 1 and 2, the elastomeric rubber body 13 is formed substantially at its axial central section with a recessed portion 14 on the upper face. A primary damping-fluid chamber 15 is defined between the inner periphery of the outer collar 11 and the upper recessed portion 14, so that the volumetric capacity of the primary damping-fluid chamber 15 is variable elastically in response to the displacement of the outer collar 11 relative to the inner collar 10, resulting from the various engine motions on the vibro-isolating device (the engine mounting) of the embodiment. As fully described later, the primary chamber 15 is partitioned into first and second main chambers 23 and 24 by way of a partition member 25. In addition to the above, the elastomeric rubber body 13 is formed substantially at the axial center section with a pair of circumferentially adjacent recessed portions 16 and 17 on the lower face. The lower recessed portion 16 cooperates with the inner peripheral wall of the outer collar 11 to define a first sub-chamber 18, whereas the lower recessed portion 17 cooperates with the inner peripheral wall of the outer collar 11 to define a second sub-chamber 19. The first and second sub-chambers 18 and 19 constructs a secondary damping-fluid chamber 20 whose volumetric capacity is variable elastically in response to changes in the volumetric capacity of the primary damping-fluid chamber 15. A portion of the elastomeric rubber body 13 facing to the first sub-chamber 18 is formed as a first diaphragm portion 21 of a first predetermined expansion-phase elasticity ($K_2$), whereas a portion of the elastomeric rubber body 13 facing to the second sub-chamber 19 is formed as a second diaphragm portion 22 of a second predetermined expansion-phase elasticity ($K_3$). The expansion-phase elasticity ($K_2$) of the first diaphragm portion 21 facing the first sub-chamber 18 is set at a small value. On the other hand, the expansion-phase elasticity ($K_3$) of the second diaphragm portion 22 facing the second sub-chamber 19 is set at a greater value in comparison with that of the first diaphragm portion 21. The partition member 25 is integrally connected to the outer collar 11 substantially at the axial central section of the inner periphery of the outer collar. The partition 25 is provided to divide the primary damping-fluid chamber 15 into the first main chamber 23 facing the upper recessed portion 14 of the elastomeric rubber body 13 and the second main chamber 24 facing the uppermost portion of the inner peripheral wall of the outer collar 11. As clearly seen in FIGS. 3 and 4, the partition member 25 consists of three portions, namely a main partition body 26 functioning to divide the primary damping-fluid chamber 15 into upper and lower chambers (the second and first main chambers 24 and 23), a channel portion 27 circumferentially extending along the inner periphery of the outer collar 11 from one end of the main partition body 26, and a guide channel portion 28 circumferentially extending from the other end of the main partition body 26. Returning to FIG. 1, reference sign 29 (see the right-hand of FIG. 1) denotes a curved groove which is defined between the inner periphery of the outer collar 11 and the outer periphery of the intermediate cylinder 12 and intercommunicates the primary damping-fluid chamber 15 and the first sub-chamber 18, whereas reference sign 32 (see the left-hand of FIG. 1) denotes a curved groove which is defined between the inner periphery of the outer collar 11 and a portion of the outer periphery of the elastomeric rubber body 13 and intercommunicates the primary damping-fluid chamber 15 and the second sub-chamber 19. The previously-discussed channel portion 27 is provided in the right-hand curved groove 29 to define a first orifice passageway 30 (simply a first orifice) by the radially inside curved wall surface of the channel portion 27 and the intermediate cylinder 12 and to define a second orifice passageway 31 (simply a second orifice) by the radially outside curved wall surface of the channel portion 27 and the inner peripheral wall surface of the outer collar 11. As can be appreciated from the fluid passageways shown in the right-hand side of FIG. 1, the first main chamber 23 is communicated with the first sub-chamber 18 via the first orifice 30, whereas the second main chamber 24 is communicated with the first sub-chamber 18 via the second orifice 31. The guide channel portion 28 is fitted into one end of the left-hand curved groove 32 to define a third orifice passageway (simply a third orifice) by the inner periphery of the outer collar 11, the outer periphery of part of the elastomeric rubber body 13, and the radially outside curved wall surface and two opposing side wall surfaces of the guide channel portion 28. The third orifice 33 is designed to intercommunicate the second main chamber 24 and the second sub-chamber 19, while properly restricting fluid flow between the two chambers 24 and 19. In the vibration isolating device of the embodiment, the first orifice 30 is designed to have a relatively great equivalent mass. The second orifice 31 is designed to have a given equivalent mass less than that of the first orifice 30. On the other hand, the third orifice 33 is designed to have a given equivalent mass less than a combined equivalent mass of the first and second orifices 30 and 31. Generally, the equivalent mass of an orifice passageway is defined as a value which is directly proportional to the entire length of the orifice passageway and inversely proportional to the cross sectional area of the orifice passageway. For example, the mass ($m_o$) of the liquid column of the first orifice 30 is given by the following formula.

$$m_o = (\gamma/g) \cdot A_2 \cdot L$$

where $\gamma$ is a specific gravity of damping fluid within the orifice 30, g is the constant of gravitation, $A_2$ represents the cross sectional area of the first orifice passageway, and L represents the entire length of the first orifice passageway. The equivalent mass ($m^*$) of the first orifice passageway 30 is given the following expression.

$$m^* = m_o(A_1/A_2)^2 = (\gamma/g) \cdot A_2 \cdot L(A_1/A_2)^2$$

$$= (\gamma/g) \cdot (A_1{}^2/A_2) \cdot L$$

where $A_1$ represents a given effective cross sectional area of the fluid-sealed vibration isolating device (the engine mount) of the first embodiment.

As appreciated from the above-mentioned expression, the equivalent mass $m^*$ of the first orifice passageway 30 is directly proportional to the cross sectional area ($A_2$) and the entire length (L) of the first orifice passageway 30.

Figure 5:
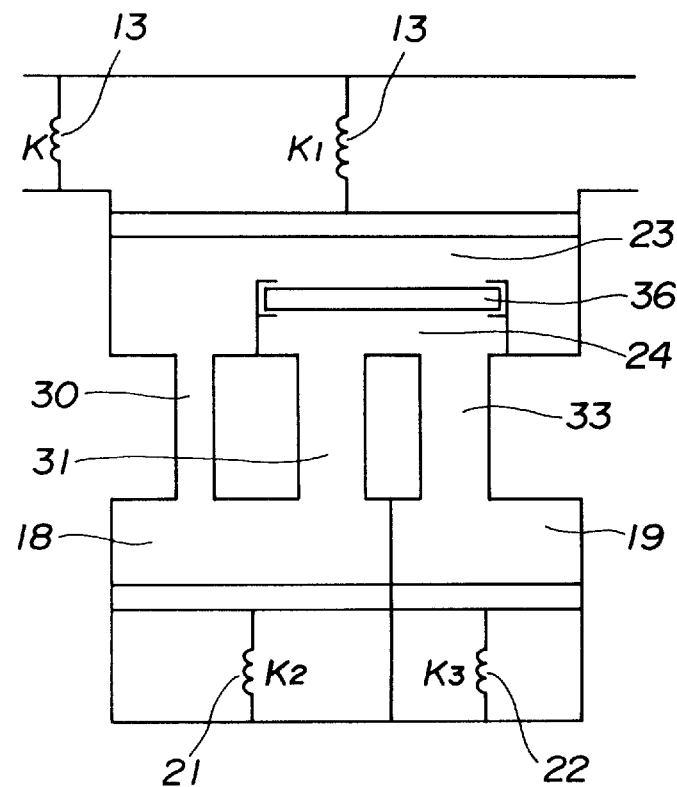
FIG. 5 is a simplified model of a vibrating system equivalent to the fluid-sealed vibration isolating device of the first embodiment.

Returning again to FIGS. 1 and 2, a retainer plate 35 is integrally connected to the horizontally-extending base wall section 34 of the main partition body 26. As seen in FIG. 2, the retainer plate 35 is formed into a hat shape in cross section. A movable rubber plate 36, serving as a fluid-flow restriction plate, is provided in a space defined between the base wall section 34 of the main partition body 26 and the inner wall surface of the hat-shaped retainer plate 35. As clearly seen in FIG. 1, the flow-restriction rubber plate 36 is movable vertically owing to vibrations of the damping-fluid mass in the vibration isolating device. To allow flow of damping fluid through the main partition body 26 and the retainer plate 35, the main partition body 26 is formed with a plurality of through openings 37, whereas the retainer plate 35 is formed with a plurality of through openings 38. Actually, the fluid pressure in damping fluid within the first main chamber 23 acts on the lower face of the flow-restriction rubber plate 36 through the through-openings 37, while the fluid pressure in damping fluid within the second main chamber 24 acts on the upper face of the rubber plate 36 through the through-openings 38. The up and down motions (displacements) of the flow-restricted rubber plate 36 depends upon the amplitude of the input vibration applied to the liquid-sealed vibration isolating device (the engine mount filled with damping fluid), so that the upper and lower faces of the rubber plate 36 alternately close the respective through-openings 38 and 37 when a low- or intermediate-frequency large-amplitude input vibration (e.g., "engine shake", approximately 10 Hz) greater than a predetermined amplitude threshold is applied. Thus, in case of application of large-amplitude input vibration of low- or intermediate-frequencies, the flow of damping fluid between the first and second main chambers 23 and 24 is restricted by was of up and down motions of the flow restriction rubber plate 36, excited by input vibration of a large amplitude above the predetermined threshold. On the other hand, the elastomeric rubber body 13 is formed with a stopper portion 39 at its bottom position being diametrically opposite to the retainer plate 35 with respect to the central axis of the inner collar 10, such that the elastomeric stopper portion 39 radially downwardly projects towards within the first sub-chamber 18. The elastomeric stopper portion 39 is provided to restrict an excessive relative displacement of the inner collar 10 relative to the outer collar 11. In FIG. 1, two spaces respectively denoted by 40 and 41 correspond air spaces which are formed in the elastomeric rubber body 13 to permit elastic deformation of the respective diaphragm portions 21 and 22. The operation of the liquid-sealed vibration isolating device of the first embodiment will be hereinafter described in detail by reference to the simplified model of the vibrating system shown in FIG. 5. In FIG. 5, the same reference signs used to designate elements in the device shown in FIGS. 1–4 will be applied to the corresponding elements used in the simplified vibrating-system model shown in FIG. 5.

Figure 6:
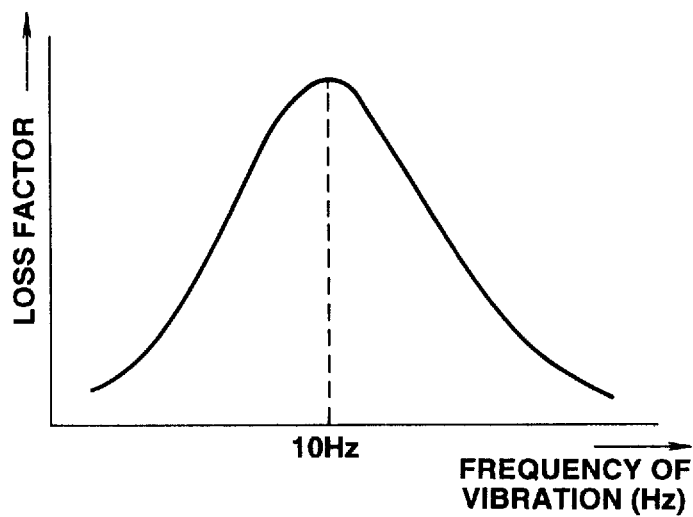
FIG. 6 is a graph illustrating a vibration-frequency versus loss-factor characteristic of the device of the first embodiment.
Figure 7:
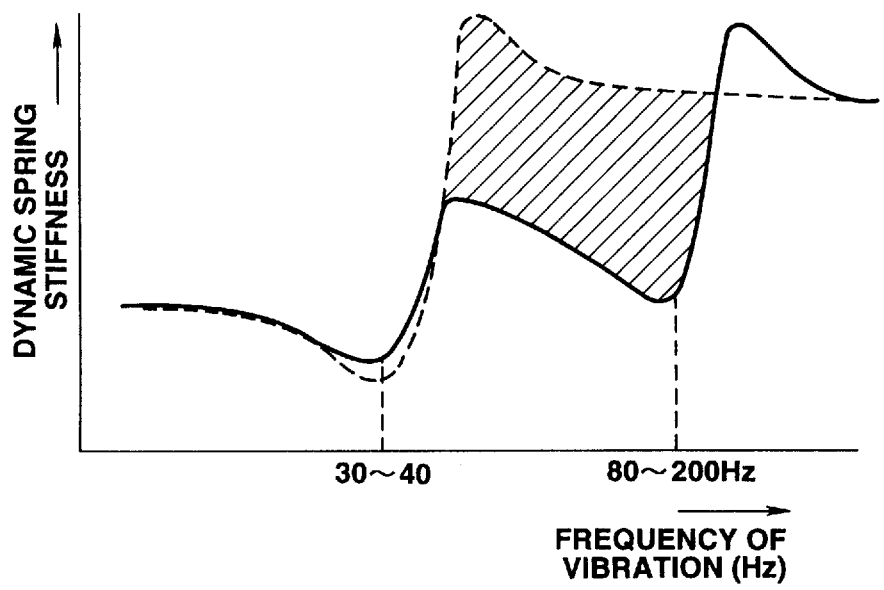
FIG. 7 is a graph illustrating a dynamic spring stiffness versus vibration-frequency characteristic of the device of the first embodiment.

Referring now to FIG. 5, K denotes an elasticity or a spring stiffness of the elastomeric rubber-to-metal bonded unit of the device, $K_1$ denotes an expansion-phase elasticity of the first main chamber 23 of the primary damping-fluid chamber 15. $K_2$ denotes an expansion-phase elasticity of the first sub-chamber 18, whereas $K_3$ denotes an expansion-phase elasticity of the second sub-chamber 19. In case of application of low- or intermediate-frequency, large-amplitude input vibrations (such as "engine shake", approximately 10 Hz), the fluid-flow restriction rubber plate 36 alternately closes the through-openings 37 of the main partition body 26 and the through-openings 38 of the retainer plate 35 by way of its up and down motions caused by the large-amplitude input vibrations. With the through-openings 37 or 38 closed by the rubber plate 36, the fluid flow between the first and second main chambers 23 and 24 via the through openings (37; 38) is restricted. When there is a relative displacement of the inner collar 10 to the outer collar 11 owing to such large-amplitude input vibrations, most of the damping fluid flows via only the first orifice 30 from the first main chamber 23 to the first sub-chamber 18 or vice versa. In this case, the low- or intermediate-frequency large-amplitude input vibrations (e.g., "engine shake") are reduced by was of a resonant vibration system including the expansion-phase elasticity $K_1$ of the first main chamber 23, the expansion-phase elasticity $K_2$ of the first sub-chamber 18, and the given equivalent mass of the first orifice passageway 30. Particularly, in the shown embodiment, the first orifice 30 is designed to have a comparatively great equivalent mass (a relatively great flow resistance), and thus a loss factor (associated with power loss or energy decrease via the first orifice) is set at a great value within a comparatively low- or intermediate-frequency range. The great loss factor, created by the first orifice 30 of a great equivalent mass, can effectively reduce the previously-noted low- or intermediate-frequency large-amplitude input vibrations such as "engine shake", approximately 10 Hz (see FIG. 6). In case of application of intermediate- or high-frequency small-amplitude input vibrations, (such as "engine-idle vibrations", 20–40 Hz), the fluid-flow restriction rubber plate 36 is kept slightly apart from the base wall section 34 of the main partition body 26 and the inside wall surface of the retainer plate 35, owing to less up-and-down motion of the rubber plate 36 resulting from input vibrations of a small amplitude. In such input vibrations, e.g., "idling vibrations", there is a fluid flow between the first main chamber 23 and the first sub-chamber 18 via the first orifice 30. At the same time, there is a fluid flow between the second main chamber 24 and the first sub-chamber 18 via the second orifice 31. Thus, the intermediate- or high-frequency small-amplitude input vibrations (e.g., "idle vibrations") are reduced by was of resonant vibration system including the expansion-phase elasticity $K_1$ of the first main chamber 23, the expansion-phase elasticity $K_2$ of the first sub-chamber 18, and the combined equivalent mass of the first and second orifice passageways 30 and 31. Since the expansion-phase elasticity $K_2$ of the first sub-chamber 18 is set at a small value enough to effectively reduce input vibrations of a small amplitude and a vibration frequency ranging 20–40 Hz. Also there is an additional fluid communication between the second main chamber 24 and the second sub-chamber 19 via the third orifice 33. However, the expansion-phase elasticity $K_3$ of the second sub-chamber 19 is set at a very great value as compared with the expansion-phase elasticity $K_2$ of the first sub-chamber 18, and thus there is a less fluid flow across the third orifice 33 within a frequency range of 20–40 Hz. Alternatively, in case of application of small-amplitude high-intensity input vibrations (boom noise) or small-amplitude high-frequency input vibrations (acceleration period noise), such as 50–300 Hz, there is almost no flow of damping fluid passing through the first orifice 30 (of a given great equivalent mass) and the second orifice 31 (of a given medium equivalent mass less than that of the first orifice 30), whereas there is a fluid flow between the second main chamber 24 and the second sub-chamber 19 via the third orifice 33 (of a considerably small equivalent mass less than the combined equivalent mass of both the first and second orifices 30 and 31). Thus, small-amplitude, high-intensity input vibrations (e.g., "boom noise")or small-amplitude, high-frequency input vibrations (e.g., "acceleration period noise") are reduced by was of a resonant vibration system including the expansion-phase elasticity $K_1$ of the first main chamber 23, the expansion-phase elasticity $K_3$ of the second sub-chamber 19, and the given small equivalent mass of the third orifice passageway 33. As set forth above, since the device of the first embodiment includes both the third orifice 33 and the second sub-chamber 19 which are effective to reduce small-amplitude high-intensity or high-frequency input vibrations (50–300 Hz). On the contrary, the prior art vibration isolating device does not include these elements 19 and 33, and as a consequence there would result in a rapid rise in a dynamic spring stiffness as indicated by the broken line of FIG. 7, because there is almost not flow of damping fluid across each of the first and second orifices within a frequency range above 40 Hz. On the other hand, the improved device of the first embodiment can produce a fluid flow of damping fluid passing through the third orifice 33 after the fluid flow across the first and second orifices 30 and 31 is reduced almost to zero. Therefore, in case of the device of the first embodiment, a dynamic spring stiffness can be effectively reduced to a small value even within a high-frequency range above 40 Hz, as indicated by the solid line of FIG. 7. As may be appreciated from an area indicated by hatching in FIG. 7, the device of the invention effectively reduces input vibrations of a high frequency close to for example 80–200 Hz.

Second Embodiment

Referring now to FIGS. 8 through 12, there is shown the second embodiment of the fluid-sealed vibration isolating device. The device of the second embodiment shown in FIGS. 8–12 is similar to the device of the first embodiment shown in FIGS. 1–4, except that the structure of first, second and third orifice passageways (50, 51, 53) included in the device of the second embodiment is different from that of the first embodiment. Thus, the same reference signs used to designate elements in the first embodiment shown in FIG. 1 will be applied to the corresponding elements used in the second embodiment shown in FIG. 8, for the purpose of comparison of the first and second embodiments. The three orifice passageways 50, 51 and 53 will be hereinafter described in detail with reference to the accompanying drawings, while detailed description of the other structure of the second embodiment will be omitted because the above description thereon seems to be self-explanatory.

Figure 8:
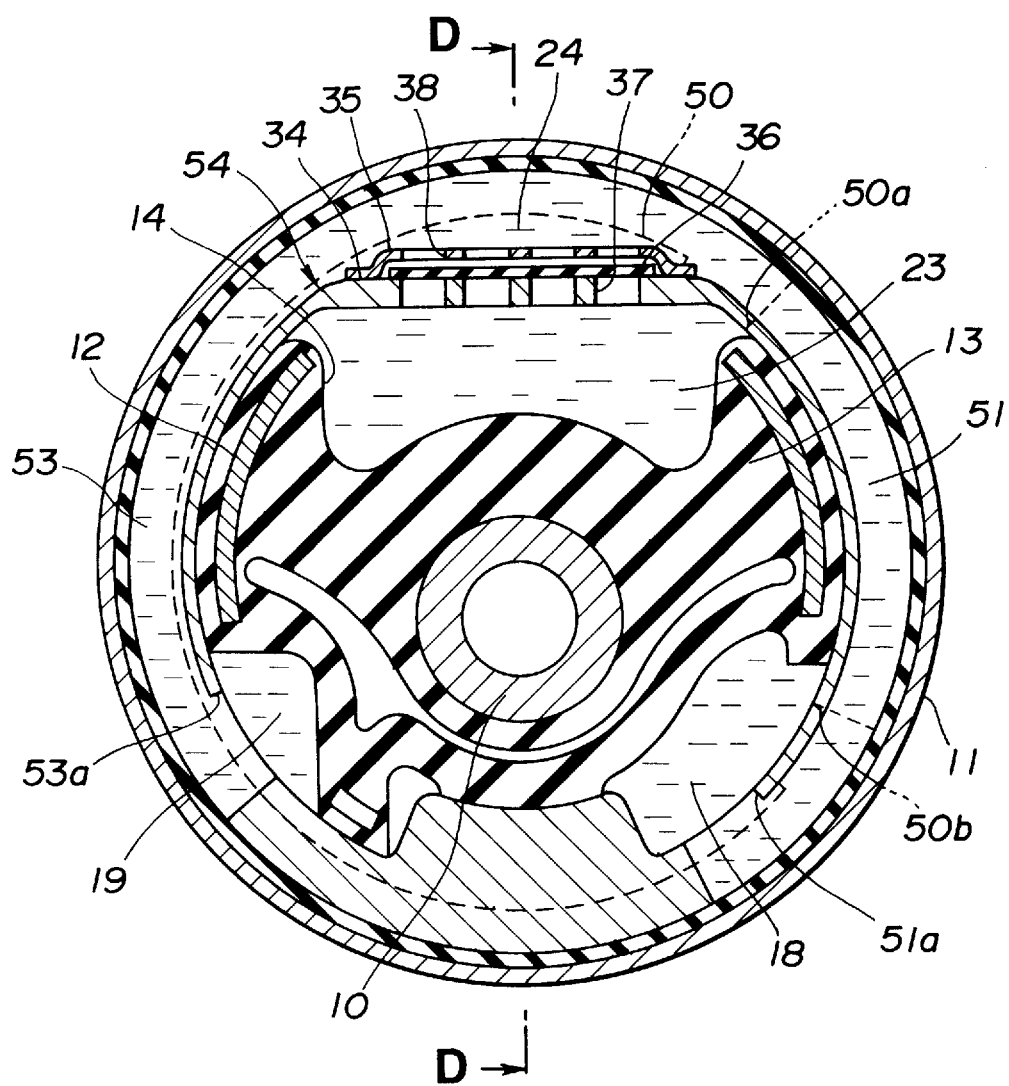
FIG. 8 is a cross section taken along the line C—C of FIG. 9, illustrating a second embodiment of a fluid-sealed vibration isolating device of the present invention.
Figure 9:
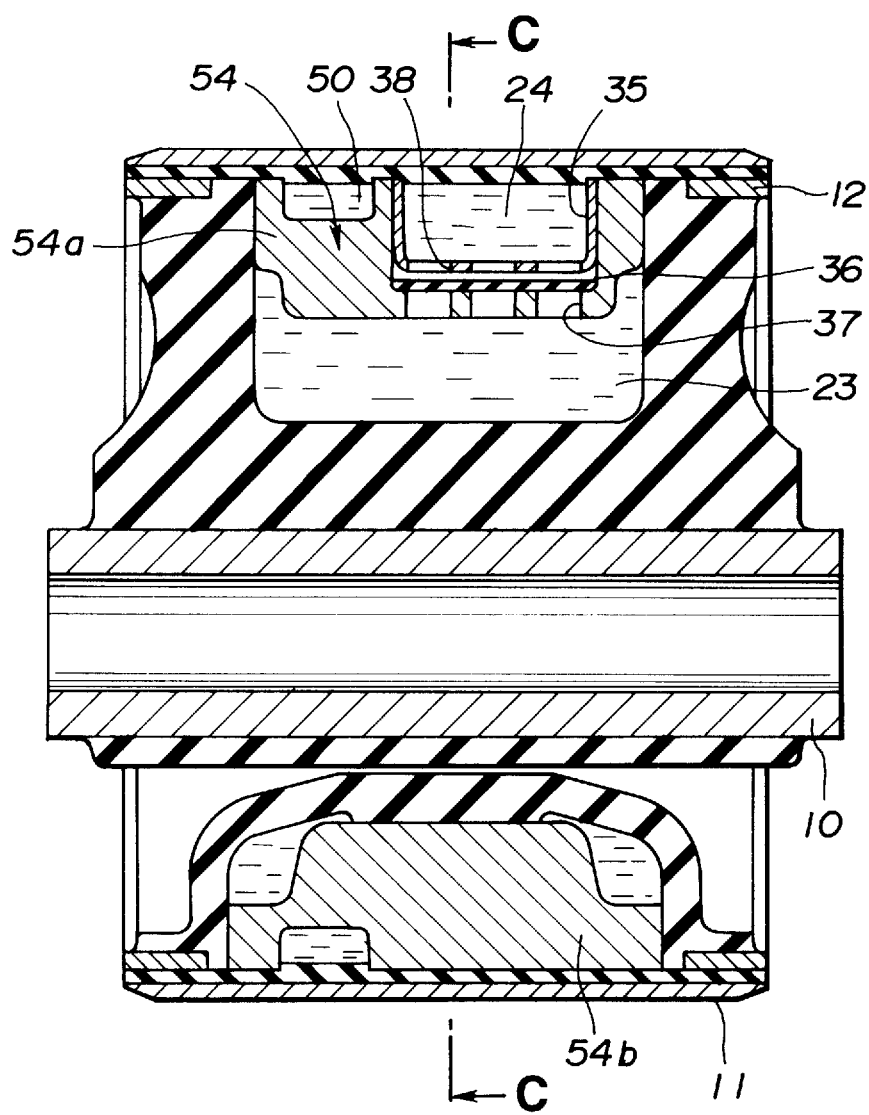
FIG. 9 is a cross section taken along the line D—D of FIG. 8.
Figure 10:
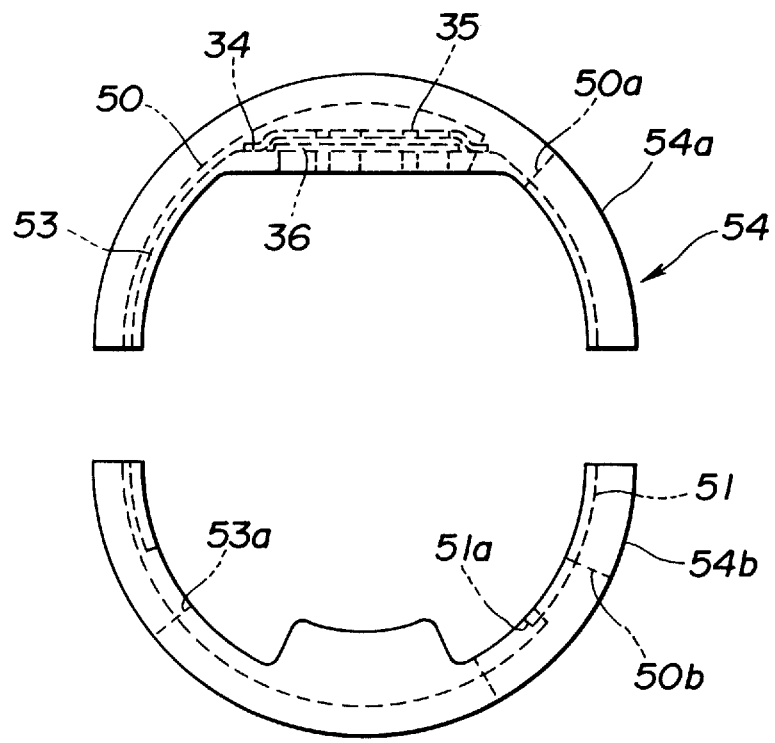
FIG. 10 is a side view illustrating a component part employed in the vibration isolating device of the second embodiment.
Figure 11:
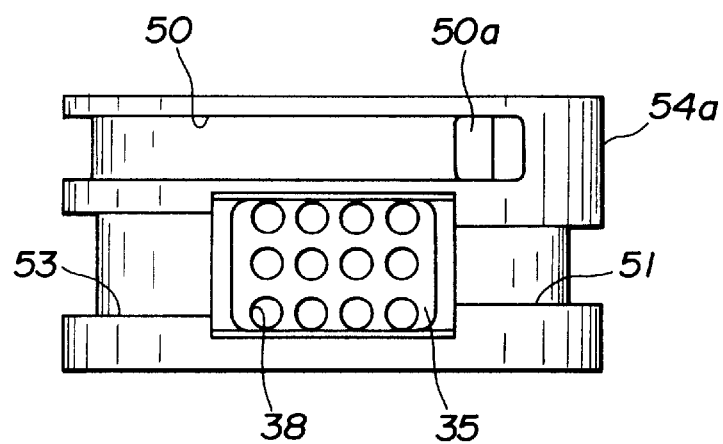
FIG. 11 is a top view of the same component part as shown in FIG. 10.
Figure 12:
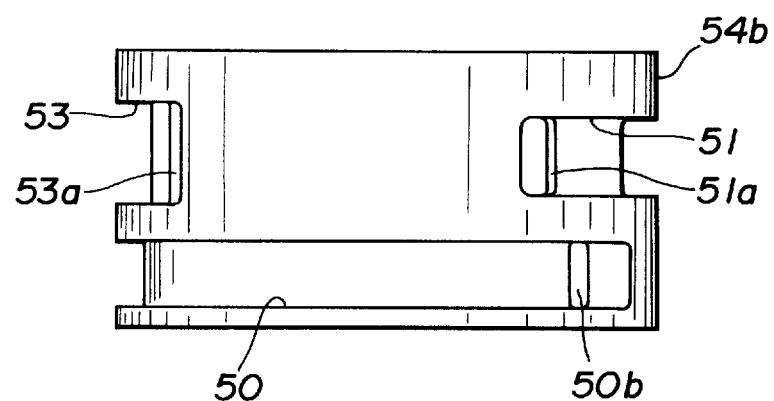
FIG. 12 is a bottom view of the same component part as shown in FIG. 10.

As clearly seen in FIGS. 8 and 10, the first, second and third orifices 50, 51 and 53 are formed as curved passageways in a substantially annular two-split partition member 54 which is fitted onto the inner peripheral surface of the axial center portion of the outer collar 11. To facilitate assembling of the substantially annular partition member 54 to the small-diameter portion 12*a* of the intermediate cylinder 12, the annular partition member 54 can be split into two sections, namely an upper half 54*a* and a lower half 54*b*. The upper partition 54*a* is formed with the horizontally-extending base wall section 34. In the same manner as the first embodiment, the base wall section 34 functions to divide the primary damping-fluid chamber 15 into first and second main chambers 23 and 24. The retainer plate 35 is integrally connected onto the base wall section 34 to operably accommodate the fluid-flow restriction rubber plate 36 in the internal space defined by the retainer plate 35 and the base wall section 34. As seen in FIGS. 9 and 11, the base wall section 34 is formed in such a manner as to be slightly offset from the axial central portion of the two-split partition member 54 in one axial direction (the axial rightward direction in Fig. 9). As shown in FIGS. 8–12, the upper and lower halves 54*a* and 54*b* assembled to each other, are formed at their location slightly offsetting axially leftward from the axial center portion of the outer collar 11 with a C-shaped (in cross section), first curved groove (of a comparatively long length and a narrow width) circumferentially counterclockwise extending from a position close to the right-hand end (viewing FIG. 8) of the base wall section 34 toward the first sub-chamber 18 over approximately ⅔ of a complete circle of the substantially cylindrical liquid-sealed vibration isolating device. As seen in FIGS. 8, 9 and 10, the substantially ⅔ circled first curved groove defines a first orifice passageway 50 (simply a first orifice) intercommunicating the first main chamber 23 and the first sub-chamber 18. An opening denoted by 50*a* represents one opening of the first orifice 50 fluidly connected to the first main chamber 23, whereas an opening denoted by 50*b* represents the other opening of the first orifice 50 fluidly connected to the first sub-chamber 18. The upper and lower halves 51*a* and 51*b* are formed with a second curved groove circumferentially clockwise extending from the right-hand end of the base wall section 34 (or the retainer plate 35) toward the first sub-chamber 18 over approximately ⅓ of a complete circle of the substantially cylindrical vibration isolating device. As seen in FIGS. 8, 10 and 11, the substantially ⅓ circled second curved groove defines a second orifice passageway 51 (of a wider passage width and a shorter passage length in comparison with the first orifice 50) intercommunicating the second main chamber 24 and the first sub-chamber 18. On the other hand, the upper and lower halves 51*a* and 51*b* are formed with a third curved groove circumferentially counterclockwise extending from the left-hand end of the base wall section 34 (or the retainer plate 35) toward the second sub-chamber 19 over approximately ⅓ of a complete circle of the substantially cylindrical vibration isolating device. As seen in FIGS. 8, 10 and 11, the substantially ⅓ circled third curved groove defines a third orifice passageway 53 (of a wider passage width and an essentially same length in comparison with the second orifice 51) intercommunicating the second main chamber 24 and the second sub-chamber 19. In FIGS. 8 and 10, an opening denoted by 51*a* represents the opening of the second orifice 51 fluidly connected to the first sub-chamber 18, whereas an opening denoted by 53*a* represents the opening of the third orifice 53 fluidly connected to the second sub-chamber 19. Since the basic structure of the device of the second embodiment is similar to the first embodiment, the device of the second embodiment can provide a superior vibration-absorption effect upon input vibrations within at least three different frequency ranges, namely 5–20 Hz (engine-shake range), 20–40 Hz (engine-idle range), and 50–200 Hz (body-boom noise range or acceleration-running range). Additionally, in the device of the second embodiment, since the first, second and third orifices 50, 51 and 53 are formed at the outer periphery of the substantially annular two-split partition member 54, each of the orifices can be dimensioned accurately. Also, since the first orifice 50 can be formed on the outer periphery of the partition member 54 in such a manner as to have a sufficient circumferential length (a satisfactory orifice passage length), the equivalent mass of the first orifice 50 can be set at a very great value, while reducing the entire size of the device. This can decrease production costs of the device, and easily set the loss factor, correlated with energy loss via the first orifice, at a great value within a low- or intermediate frequency range, thus enhancing a vibration damping performance of the device.

Figure 13:
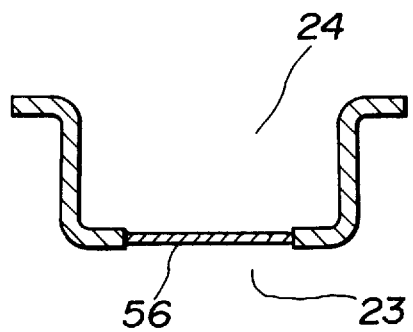
FIG. 13 is a cross section illustrating a modification of a component part employed in the vibration isolating device of the first and second embodiments.

In the device of the first and second embodiments, although the fluid-flow restriction plate is formed as a movable rubber plate 36, the movable rubber plate 36 may be replaced with a rubber membrane 56 (see FIG. 13) integrally formed with a cloth of loose texture (having a number of openings). The cloth reinforced rubber membrane 56, into which a cloth of loose texture is buried, permits a flow of damping fluid passing between the first and second main chambers 23 and 24 therevia in case of application of small-amplitude input vibrations. Conversely, in case of application of low- or intermediate frequency large-amplitude input vibrations, the rubber membrane 56 containing a cloth of loose texture acts to restrict the displacement of the rubber membrane 56 itself and thus prevents the damping-fluid flow via it. The rubber membrane with a cloth is simple, production costs of the device can be further reduced.

Third Embodiment

Figure 14:
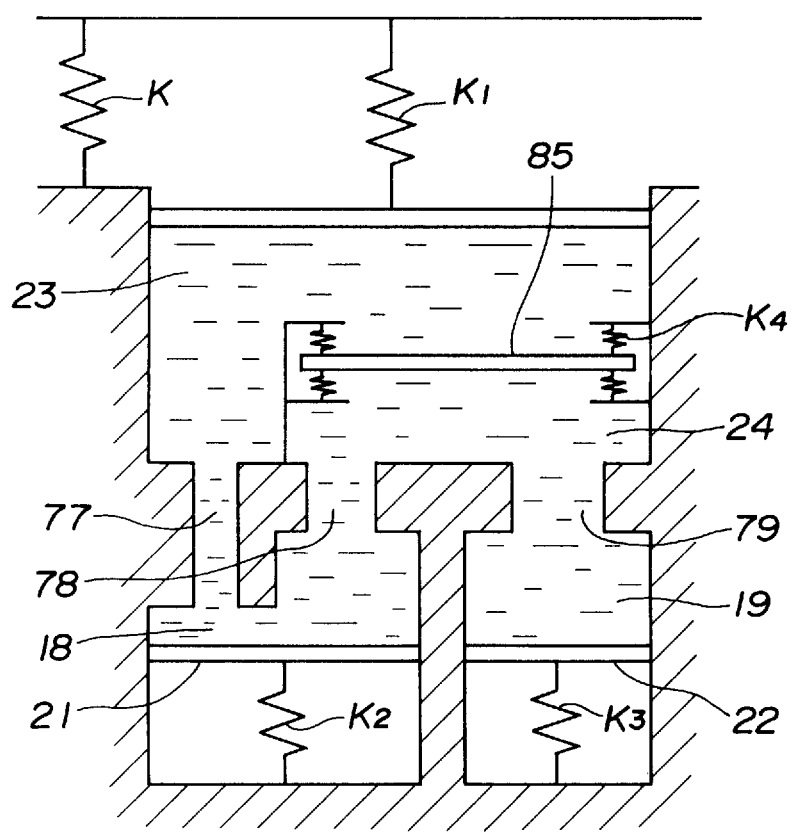
FIG. 14 is a simplified model of a vibrating system equivalent to a fluid-sealed vibration isolating device of a third embodiment.
Figure 15:
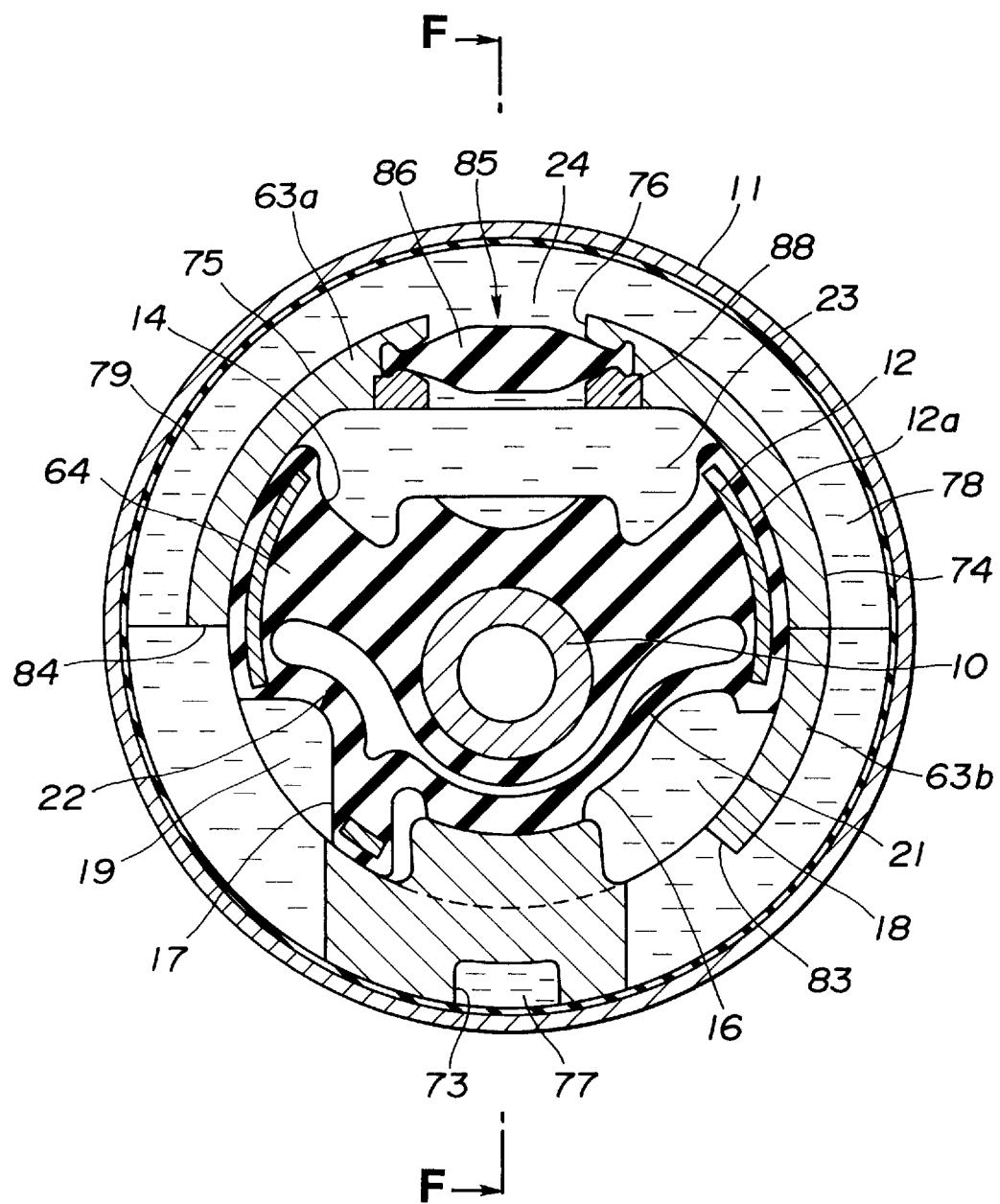
FIG. 15 is a cross section taken along the line E—E of FIG. 16, illustrating the detailed structure of the fluid-sealed vibration isolating device of the third embodiment.
Figure 16:
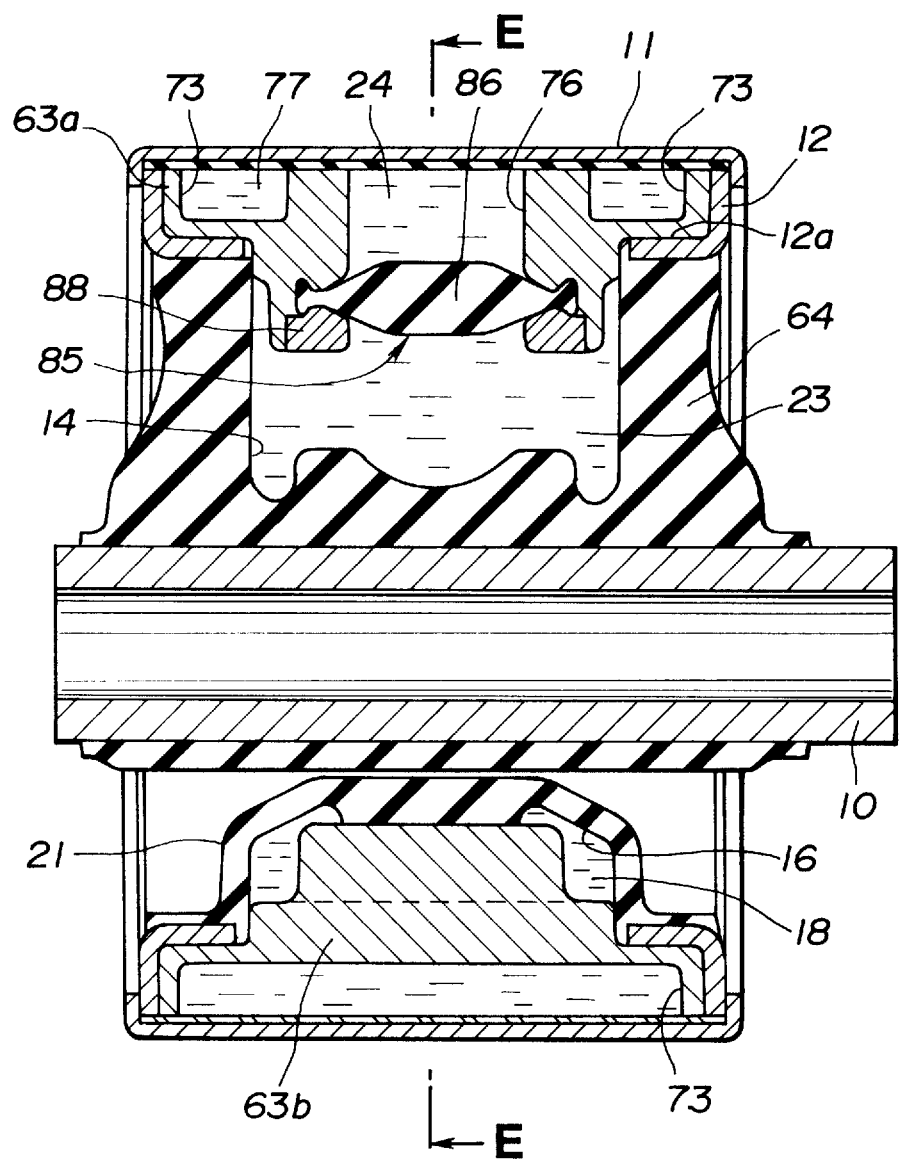
FIG. 16 is a cross section taken along the line F—F of FIG. 15.
Figure 17:
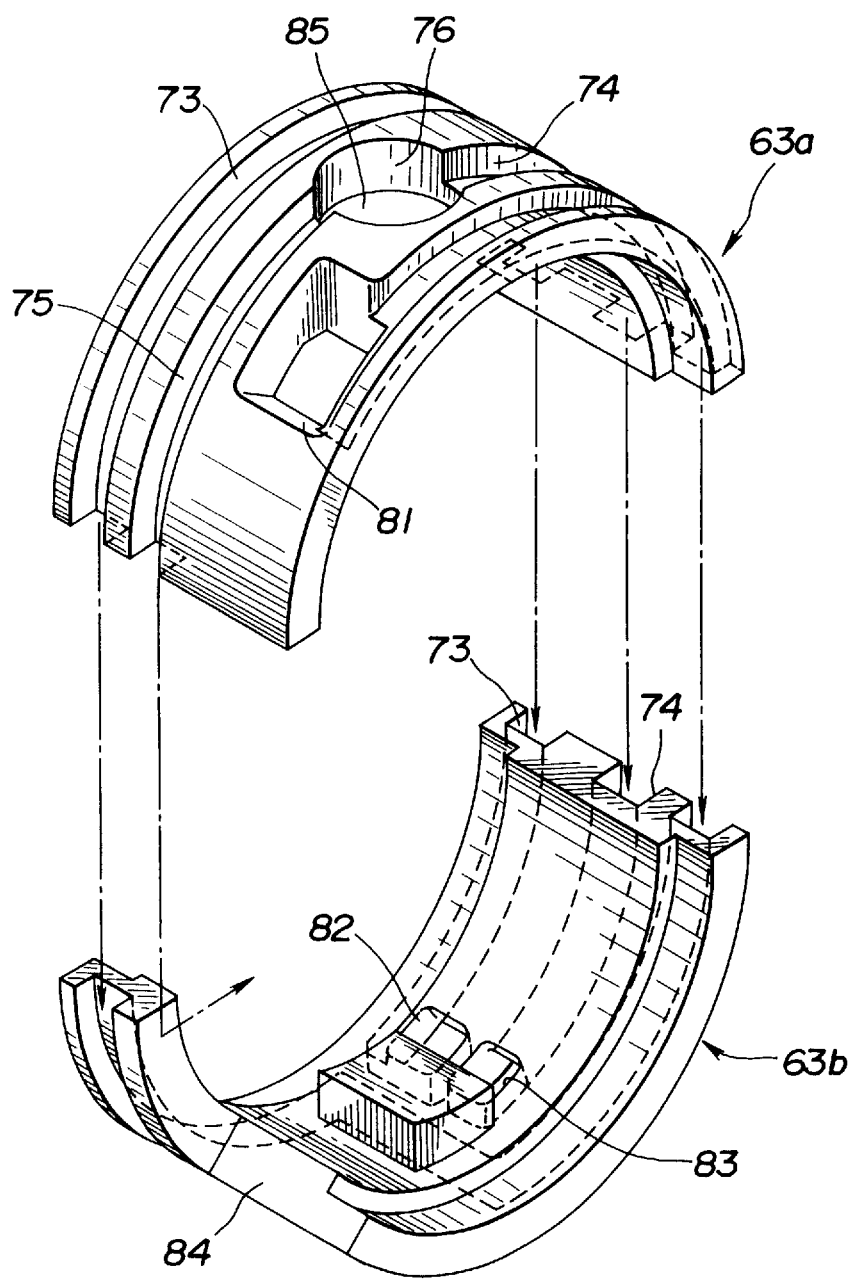
FIG. 17 is a disassembled view illustrating a component part employed in the device of the third embodiment.
Figure 18:
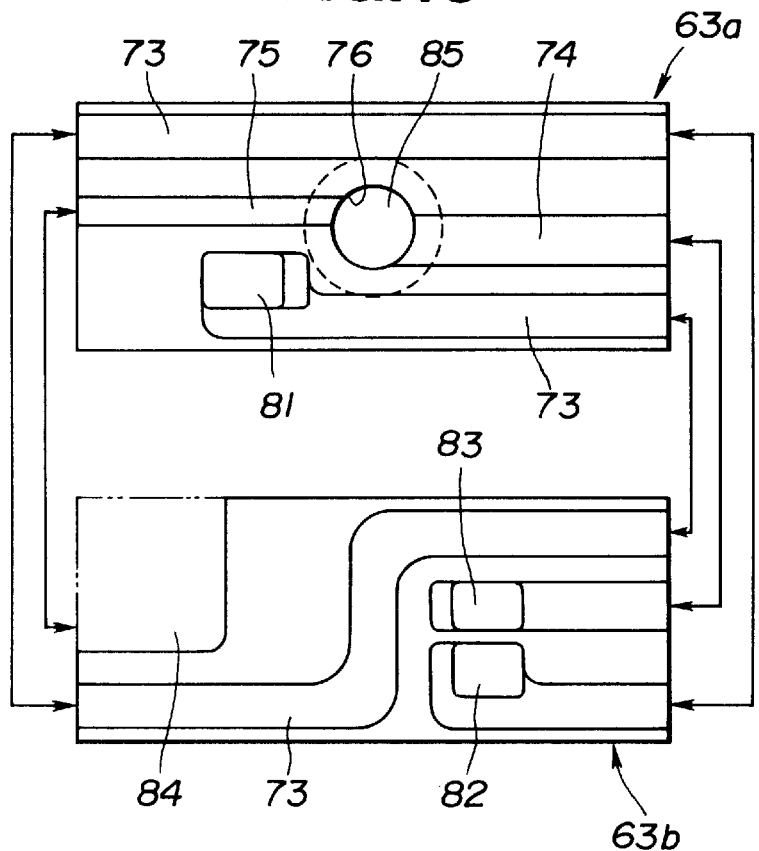
FIG. 18 is a composite illustration involving both top and bottom views of the same component part as shown in FIG. 17.
Figure 19:
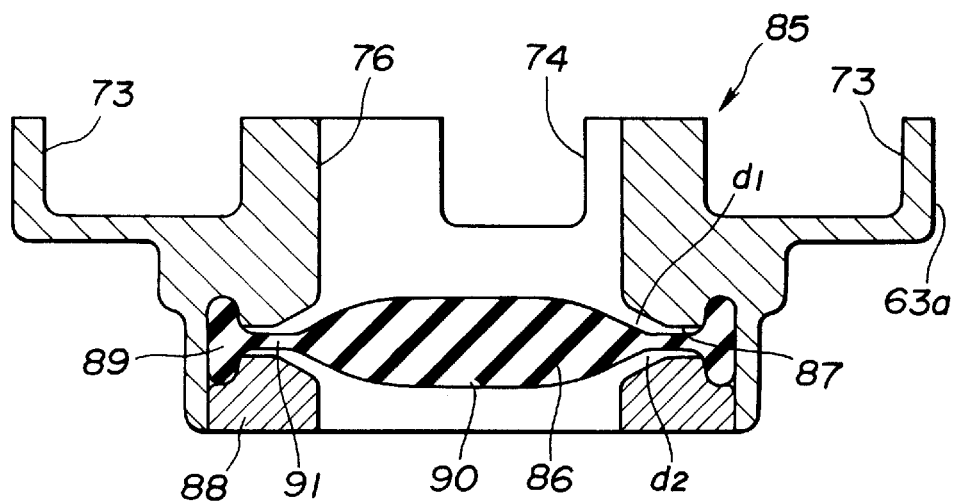
FIG. 19 is an enlarged cross section of a component part (an elastomeric diaphragm unit) employed in the device of the third embodiment.

Referring now to FIGS. 14 through 19, there is shown the third embodiment of the fluid-sealed vibration isolating device. The device of the third embodiment shown in FIGS. 14–19 is somewhat similar to the device of the second embodiment employing a substantially annular two-split partition member 54. Thus, the same reference signs used to designate elements in the second embodiment shown in FIGS. 8–12 will be applied to the corresponding elements used in the third embodiment, for the purpose of comparison of the second and third embodiments. The device of the third embodiment is different from that of the second embodiment in that a fluid-flow restriction unit of the first and second embodiments, consisting of the fluid-flow restriction plate 36, the retainer plate 35, and the base wall section 34 of the main partition body 26, is replaced with a flexible elastic diaphragm unit 85 of an elasticity or a spring stiffness $K_4$ (within a small-amplitude input vibration range). As seen in FIGS. 15 and 16, the intermediate cylinder 12 and the two-split partition member (consisting of a pair of orifice members 63*a* and 63*b*) are tightly fitted to the inner periphery of the outer collar 11. The intermediate cylinder 12 is bonded to the inner collar 10 by means of an elastomeric rubber body (or an elastic rubber body) 64 to form a rubber-to-metal bonded unit. As best seen in FIG. 16, the pair of orifice members 63a and 63b are fitted to the small-diameter portion 12a of the intermediate cylinder 12, so that the two-split orifice members 63a and 63b are assembled to each other to form a substantially cylindrical orifice unit (63a; 63b). An internal space defined between the upper orifice member 63a and the upper recessed portion 14 of the elastomeric rubber body 64 corresponds to the first main chamber 23. An internal space defined between the lower orifice member 63b and the lower recessed portion 16 corresponds to the first sub-chamber 18. An internal space defined between the other lower recessed portion 17 corresponds to the second sub-chamber 19. When the pair of orifice members 63a and 63b are fitted to the inner periphery of the outer collar 11, first, second and third circumferentially-extending fluid grooves 73, 74 and 75 are defined. Additionally, the upper orifice member 63a is formed with a substantially cylindrical bore section 76. When assembling, the first, second and third grooves 73, 74 and 75 and the bore section 76 respectively form first, second and third orifices 77, 78 and 79 and the second main chamber 24. In the same manner as discussed above, the first and second main chamber 23 and 24 and the first and second sub-chambers 18 and 19 and the first, second and third orifice passageways 77, 78 and 79 are filled with incompressible damping fluid such as ethylene glycol or the like. The first and second main chambers 23 and 24 cooperate with each other to define the primary damping-fluid chamber 15 whose fluid pressure is changeable in response to the relative displacement of the outer collar 11 to the inner collar 10. On the other hand, the first and second sub-chambers 18 and 19 cooperate with each other to define the secondary damping-fluid chamber 20 whose volumetric capacity varies elastically in response to changes in the pressure in the primary damping-fluid chamber 15. As shown in FIGS. 17 and 18, the circumferentially-extending first groove 73 (or the first orifice 77) is formed over approximately 1.5 times longer than a complete circle of the substantially cylindrical orifice member pair (63a; 63b). One end of the first groove 73 (the first orifice 77) is communicated with the first main chamber 23 through a substantially rectangular opening 81 of the upper orifice member 63a. The end of the first groove 73 is communicated with the first sub-chamber 18 through a substantially rectangular opening 82 of the lower orifice member 63b. The second groove 74 (or the second orifice 78) is formed over approximately ⅓ of a complete circle of the substantially cylindrical orifice member pair (63a; 63b). The second groove 74 (the second orifice 78) is communicated at one end with the substantially cylindrical bore section 76 (or the second main chamber 24), and communicated at the other end with the first sub-chamber 18 through a substantially rectangular opening 83 of the lower orifice member 63b. The third groove 75 (or the third orifice 79) is also formed over approximately ⅓ of a complete circle of the substantially cylindrical orifice member pair (63a; 63b). The third groove 75 (the third orifice 79) is communicated at one end with the substantially cylindrical bore section 76 (or the second main chamber 24), and communicated at the other end with the second sub-chamber 19 through an opening 84 of the lower orifice member 63b. As seen in FIGS. 15, 16 and 19, the flexible elastic diaphragm unit 85 is fitted to the bottom of the substantially cylindrical bore section 76 for separating the two main chambers 23 and 24 by it. As clearly seen in FIG. 19, the flexible diaphragm unit 85 comprises a circular elastic diaphragm portion 86 made of uniform elastomeric rubber material or the like, an enlarged-diameter diaphragm-receiving portion 87 formed at bottom section of the upper orifice member 63a, and an annular retainer 88 fitted into the diaphragm-receiving portion 87 while sandwiching the perimeter of the elastic diaphragm portion 86. The elastic diaphragm portion 86 includes a relatively thick-walled, central convex high-rigidity section 90, an annular intermediate thin-walled low-rigidity section 91 radially tapered from the thick-walled convex high-rigidity section 90, and a cylindrical outermost flanged section 89. These sections 89, 90 and 91 are formed integral with each other. Actually, only the cylindrical flanged section 89 is sandwiched or supported between the inner periphery of the diaphragm-receiving portion 87 and the ring-shaped retainer 88 in such a manner as to permit elastic deformation of the elastic diaphragm portion 86 in its axial direction. Therefore, when an external force (or input vibration) is applied to the elastic diaphragm portion 86, the thin-walled low-rigidity section 91 mainly deformed elastically. In more detail, the corner of the diaphragm-receiving portion 87 is further recessed to reliably support the flanged section 89, whereas the inside edge of the diaphragm-receiving portion 87 is chamfered to permit the previously-noted axial elastic deformation of the elastic diaphragm portion 86. For the same reason set out above, the inside edge of the retainer 88, facing to the outer wall of the diaphragm portion 86, is also chamfered in consideration of a gradual increase in the thickness from the thin-walled section 91 to the thick-walled section 90. In addition, a first aperture or space $d_1$ is defined between the upper face of the thin-walled low-rigidity section 91 and the stepped portion of the upper orifice member 63a, whereas a second aperture or space $d_2$ is defined between the lower face of the low-rigidity section 91 and the upper face of the annular retainer 88. The spaces d1 and d2 and the two opposing chamfered sections of the orifice member 63a and the retainer 88 permits a desired elastic deformation of the thin-walled section 91 when the vibration isolating device vibrates. In other words, if the axial displacement (up and down motions) of the convex high-rigidity section 90 exceeds the magnitude of the space denoted by $d_1$ and $d_2$, the deformation of the thin-walled low-rigidity section 91 is restricted by was of abutment between the upper face of the low-rigidity section 91 and the inner wall surface of the diaphragm receiving portion 87 and abutment between the lower face of the low-rigidity section 91 and the wall surface of the retainer 88. As a consequence, the elastic diaphragm unit 85 exhibits a non-linear spring-stiffness characteristic shown in FIG. 20. That is, a spring load of the diaphragm unit 85 increases in proportion to the increase in a deflection (an amplitude of input vibration) until the amplitude of input vibration is less than a predetermined amplitude (a predetermined deflection a) determined by the spaces $d_1$ and $d_2$. As soon as the predetermined amplitude has reached, a spring load of the diaphragm unit 85 rapidly increases in accordance with the increase in deflection (the amplitude of input vibration). The operation of the liquid sealed vibration isolating device of the third embodiment will be hereinafter described in detail by reference to the simplified model of the vibrating system shown in FIG. 14. In FIG. 14, the same reference signs used to designate elements in the device shown in FIGS. 15 and 16 will be applied to the corresponding elements used in the simplified vibrating-system model shown in FIG. 14.

Figure 21:
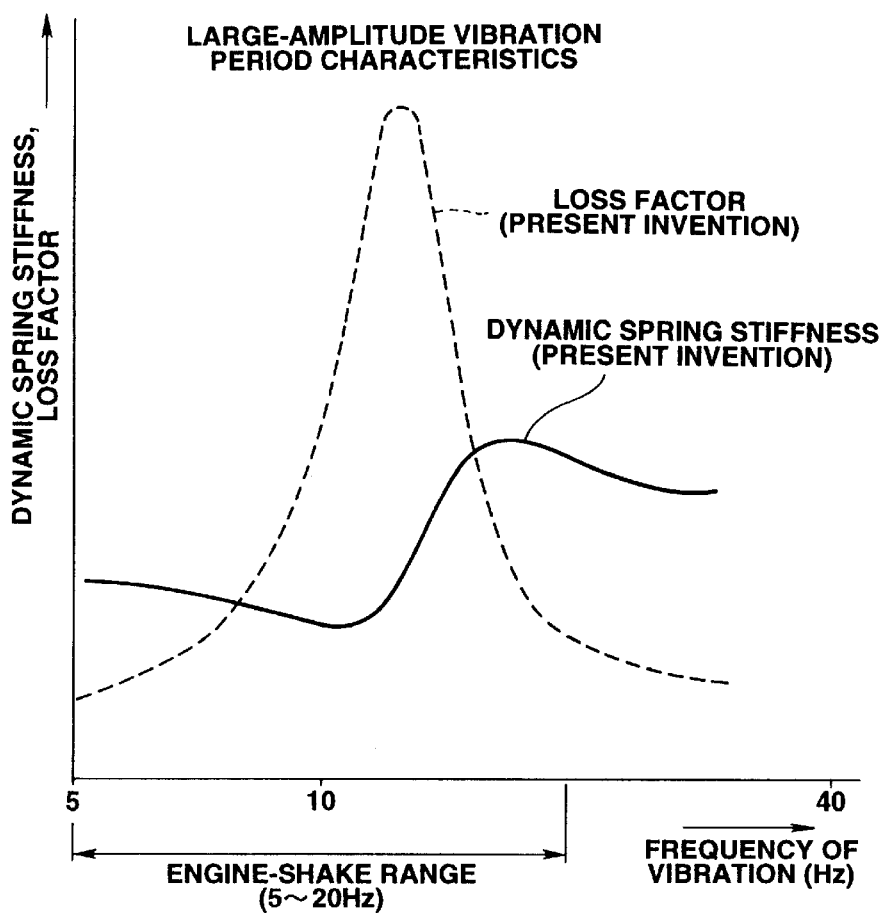
FIG. 21 shows a vibration-frequency versus dynamic spring stiffness characteristic and a vibration-frequency versus loss-factor characteristic when the device of the third embodiment vibrates with large amplitudes.

Referring now to FIG. 14, K denotes an elasticity or a spring stiffness of the elastomeric rubber-to-metal bonded unit of the device, $K_1$ denotes an expansion-phase elasticity of the first main chamber 23 of the primary damping-fluid chamber 15. $K_2$ denotes an expansion-phase elasticity of the first sub-chamber 18, whereas $K_3$ denotes an expansion-phase elasticity of the second sub-chamber 19. $K_4$ denotes an elasticity or a spring stiffness of the elastic diaphragm unit 85 within a small-amplitude input vibration range. The device of the third embodiment has four resonant vibration systems. That is to say, in the presence of low- or intermediate-frequency large-amplitude input vibrations (e.g., "engine shake"), the device provides a large-amplitude period resonant vibration system including the expansion-phase elasticity $K_1$ of the first main chamber 23, the expansion-phase elasticity $K_2$ of the first sub-chamber 18, and the given equivalent mass of the first orifice passageway 77. In the presence of low- or intermediate-frequency small-amplitude input vibrations (e.g., input vibrations during paved-road running), the device provides a first resonant vibration system including the expansion-phase elasticity $K_1$ of the first main chamber 23, the expansion-phase elasticity $K_2$ of the first sub-chamber 18, the spring stiffness $K_4$ (within a small-amplitude vibration range) of the elastic diaphragm unit 85, and the given equivalent mass of the first orifice passageway 77. In the presence of intermediate- or high-frequency low-amplitude input vibrations (e.g., idling vibrations), the device provides a second resonant vibration including the expansion-phase elasticity $K_1$ of the first main chamber 23, the expansion-phase elasticity $K_2$ of the first sub-chamber 18, the spring stiffness $K_4$ (within a small-amplitude vibration range) of the elastic diaphragm unit 85, and the given equivalent mass of the second orifice passageway 78. In the presence of small-amplitude high-intensity input vibrations (boom noise) or small-amplitude high-frequency input vibrations (acceleration period noise), the device provides a third resonant vibration including the expansion-phase elasticity $K_1$ of the first main chamber 23, the expansion-phase elasticity $K_3$ of the second sub-chamber 19, the spring stiffness $K_4$ (within a small-amplitude vibration range) of the elastic diaphragm unit 85, and the given equivalent mass of the third orifice passageway 79. In the third embodiment, the resonance frequency of the large-amplitude period resonant vibration system is set at a vibration frequency within a so-called engine-shake range (for example 5–20 Hz). The resonance frequency of the first small-amplitude period resonant vibration system is set at a vibration frequency within a so-called paved-road running range (for example 5–20 Hz). The resonance frequency of the second small-amplitude period resonant vibration system is set at a vibration frequency within a so-called idling vibration range (for example 25–50 Hz). The resonance frequency of the third small-amplitude period resonant vibration system is set at a vibration frequency within a so-called boom-noise range or acceleration-period vibration range (for example 50–300 Hz). The resonance frequency of each of the four resonant vibration systems is suitably determined by varying a length and a cross-sectional area of each of the orifices 77, 78 and 79, and each of the spring stiffnesses $K_1$, $K_2$, $K_3$ and $K_4$. Hereinafter described in detail is the operation of the device of the third embodiment by reference to the characteristics shown in FIGS. 21 and 22.

Figure 20:
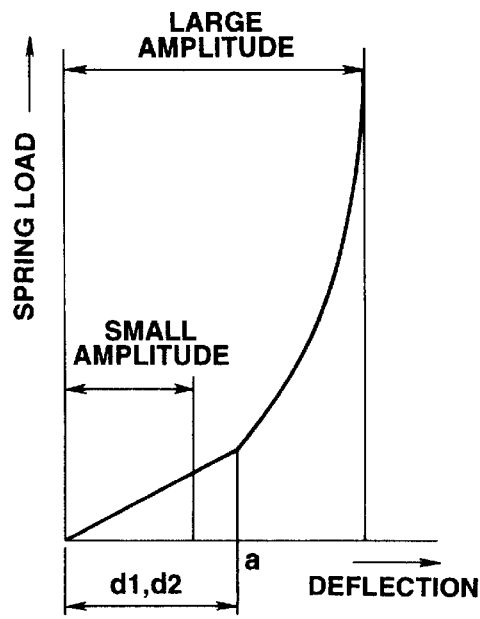
FIG. 20 is a graph illustrating a deflection versus spring load characteristic of the flexible diaphragm included in the elastomeric diaphragm unit shown in FIG. 19.
Figure 22:
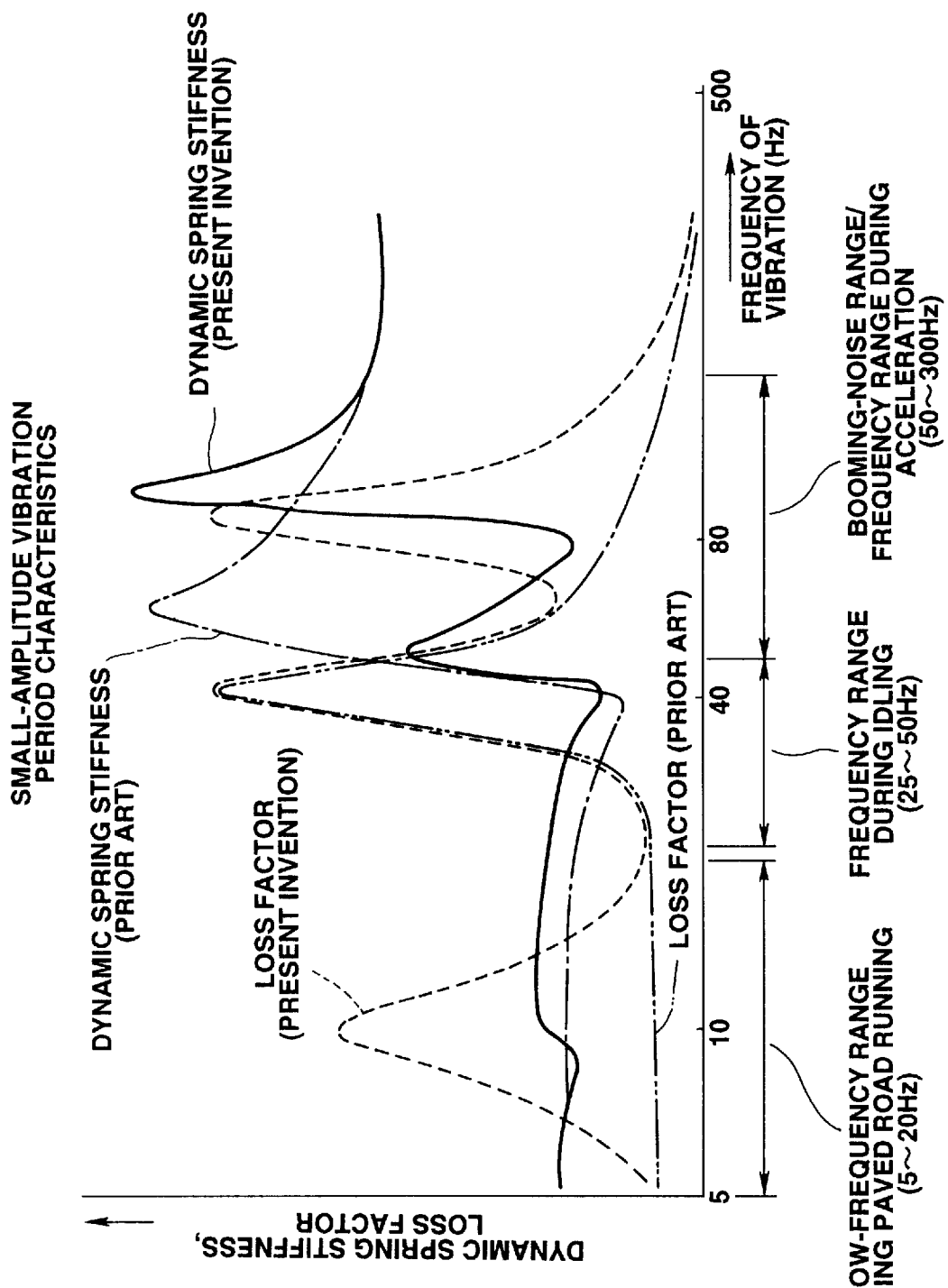
FIG. 22 shows a vibration-frequency versus dynamic spring stiffness characteristic and a vibration-frequency versus loss-factor characteristic when the device of the third embodiment vibrates with small amplitudes.
Figure 23:
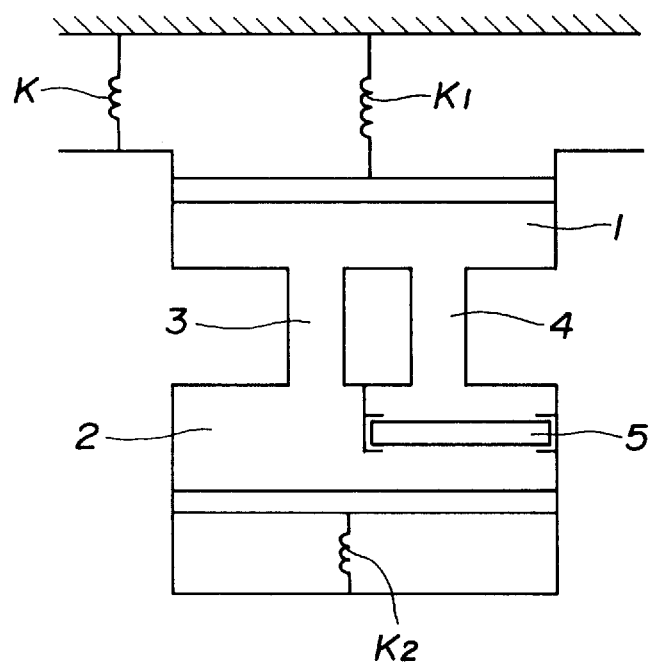
FIG. 23 is simplified model of a vibrating system equivalent to the prior art fluid-sealed vibration isolating device.

In the case of application of so-called "engine shake" (low- or intermediate-frequency large-amplitude input vibrations, 5–20 Hz), the spring load of the elastic diaphragm unit 85 rapidly increases as indicated in the right-hand half of FIG. 20 owing to the "engine-shake" input-vibration amplitude greater than the predetermined amplitude. Thus, a fluid flow between the first and second main chamber 23 and 24 is restricted by means of the elastic diaphragm unit 85 and as a result, a substantial flow of damping fluid in the device is achieved by only the first orifice 77. In this case, the previously-discussed large-amplitude resonant vibration system acts to effectively damp the "engine shaking". Owing to the liquid-column resonance of the first orifice 77, a greatest loss factor is obtained near a particular frequency of 10 Hz essentially equivalent to the engine-shake frequency, as indicated by the broken line of FIG. 21. The greatest loss factor whose peak frequency is set at a low- or intermediate frequency range close to 10 Hz, is effective to reduce or damp engine shaking. In the case of application of input vibrations during paved-road running (low- or intermediate-frequency small-amplitude input vibrations, 5–20 Hz), the elastic diaphragm unit 85 exhibits a left-hand spring characteristic of FIG. 20 (that is, a low spring-stiffness characteristic), since the amplitude of the input vibration is less than the predetermined amplitude during paved-road running. Thus, the elastic diaphragm unit 85 permits a fluid flow between the first and second main chambers 23 and 24 by way of elastic deformation. In such a paved-road running range, the aforementioned first small-amplitude period resonant vibration system acts to effectively damp vibrations created during paved-road running. Owing to the liquid-column resonance of the first orifice and the elastic deformation (within the small-amplitude vibration range) of the elastic diaphragm unit 85, the device provide a great loss factor whose peak frequency is set at approximately 10 Hz. In the case of application of engine-idle vibrations (intermediate- or high-frequency small-amplitude input vibrations, 25–50 Hz), the elastic diaphragm unit 85 exhibits the low spring-stiffness characteristic (see the left-hand side of the graph indicated in FIG. 20). At this time, the device acts to permit the flow between the first and second main chambers and to create the previously-noted second small-amplitude period resonant vibration system, thus effectively reducing a dynamic spring stiffness within engine-idling vibration frequency range (25–50 Hz, particularly 40 Hz). On the other hand, in the presence of booming noise (small-amplitude high-intensity input vibrations, 50–300 Hz) or acceleration-period noise (small-amplitude high-frequency input vibrations, 50–300 Hz), the elastic diaphragm unit 85 exhibits the low spring-stiffness characteristic (see the left-hand side of the graph indicated in FIG. 20). In this case, the device acts to permit the flow between the first and second main chambers and to create the previously-noted third small-amplitude period resonant vibration system, thus effectively reducing a dynamic spring stiffness within booming-noise range or acceleration-period noise range (50–300 Hz, particularly 80 Hz). In FIG. 22, for the purpose of comparison between the prior art device and the device of the third embodiment, the dynamic spring stiffness of the present invention is indicated by the solid line, the dynamic spring stiffness of the prior art device is indicated by the one-dotted line, the loss factor of the present invention is indicated by the broken line, and the loss factor of the prior art device is indicated by the two-dotted line. As appreciated from the left-hand hatching area of FIG. 22, the loss factor of the device of the third embodiment is remarkably increased near approximately 10 Hz (within a low- or intermediate-frequency range) in comparison with the prior art device. In addition, as appreciated from the right-hand hatching area of FIG. 22, the dynamic spring stiffness of the device of the third embodiment is remarkably reduced within a high frequency range of 40–80 Hz. As set forth above, the device of the third embodiment can provide an additional vibration-absorption effect with respect to low- or intermediate-frequency small-amplitude input vibrations created during driving on paved roads, in addition to the same effects as the devices of the first and second embodiments.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A fluid-sealed vibration isolating device comprising:

primary and secondary damping-fluid chambers (15, 20) having respective individual expansion-phase elasticities;

a fluid-flow restrictive means (36; 85) for dividing said primary damping-fluid chamber (15) into a first main chamber (23) disposed in a side of a member which vibrates and having a first expansion-phase elasticity ($K_1$) and a second main chamber (24) disposed in the opposite side, and being responsive to an amplitude of input vibration for restricting a flow of damping fluid between said first and second main chambers (23, 24) when the amplitude of input vibration is greater than a predetermined amplitude;

said secondary damping-fluid chamber (20) including a first sub-chamber (18) having a second expansion-phase elasticity ($K_2$) and a second sub-chamber (19) having a third expansion-phase elasticity ($K_3$);

a first orifice passageway means (30; 50; 77) for defining a flow restrictive passage between said first main chamber (23) and said first sub-chamber (18);

a second orifice passageway means (31; 51; 78) for defining a flow restrictive passage between said second main chamber (24) and said first sub-chamber (18); and a third orifice passageway means (33; 53; 79) for defining a flow restrictive passage between said second main chamber (24) and said second sub-chamber (19);

wherein said fluid-flow restrictive means (36; 85) associated with said second and third orifice passageway means for creating at least three resonant vibration systems required to damp three different input vibrations including an engine shake, an idling vibration, and a high-frequency vibration.

2. A fluid-sealed vibration isolating device as claimed in claim 1, wherein said fluid-flow restrictive means (36; 85) comprises a fluid-flow restriction plate (36) restricting a flow of damping fluid passing through each of said second and third orifice passageway means when the amplitude of input vibration exceeds said predetermined amplitude.

3. A fluid-sealed vibration isolating device as claimed in claim 2, wherein the second expansion-phase elasticity ($K_2$) of said first sub-chamber (18) is set at a small value and the third expansion-phase elasticity ($K_3$) of said second sub-chamber (19) is set to be greater than the second expansion-phase elasticity ($K_2$) of said first sub-chamber (18), and wherein a given equivalent mass of said first orifice passageway means is set at a great value, a given equivalent mass of said second orifice passageway means is set to be less than the given equivalent mass of said first orifice passageway means, and a given equivalent mass of said third orifice passageway means is set to be less than a combined equivalent mass of said first and second orifice passageway means.

4. A fluid-sealed vibration isolating device as claimed in claim 1, which further comprises a cylindrical outer collar (11) adapted to be connected with one of a vibrating body (engine) and a base (chassis), an cylindrical inner collar (10) adapted to be connected with the other, an intermediate orifice member (12, 25; 12, 54; 12, 63a, 63b) interposed between said outer and inner collars (10, 11) and an elastomeric rubber body (13; 64) tightly interposed between said inner collar (10) and at least one of said intermediate orifice member and said outer collar (11), and wherein said inner and outer collars (10, 11), said intermediate orifice member (12, 25; 12, 54; 12, 63a, 63b) and said elastomeric rubber body (13; 64) cooperate with each other to define all said primary and secondary damping-fluid chambers, and said first, second and third orifice passageway means.

5. A fluid-sealed vibration isolating device comprising:

primary and secondary damping-fluid chamber (15, 20) having respective individual expansion-phase elasticities;

a fluid-flow restrictive means (36; 85) for dividing said primary damping-fluid chamber (15) into a first main chamber (23) disposed in a side of a member which vibrates and having a first expansion-phase elasticity ($K_1$) and a second main chamber (24) disposed in the opposite side, and being responsive to an amplitude of input vibration for restricting a flow of damping fluid between said first and second main chambers (23, 24) when the amplitude of input vibration is greater than a predetermined amplitude; said fluid-flow restrictive means (36; 85) including an elastic diaphragm unit (85) of a non-linear spring-stiffness characteristic according to which said elastic diaphragm unit (85) exhibits a spring stiffness ($K_4$) within a small-amplitude input vibration range;

said secondary damping-fluid chamber (20) including a first sub-chamber (18) having a second expansion-phase elasticity ($K_2$) and a second sub-chamber (19) having a third expansion-phase elasticity ($K_3$);

a first orifice passageway means (30; 50; 77) for defining a flow restrictive passage between said first main chamber (23) and said first sub-chamber (18);

a second orifice passageway means (31; 51; 78) for defining a flow restrictive passage between said second main chamber (24) and said first sub-chamber (18); and a third orifice passageway means (33; 53; 79) for defining a flow restrictive passage between said second main chamber (24) and said second sub-chamber (19);

wherein said fluid-flow restrictive means (36; 85) associated with said second and third orifice passageway means for crating four resonant vibration systems required to damp four different input vibrations including an engine shake, an input vibration during paved-road running, an idling vibration, and a high-frequency vibration, wherein a resonance frequency of a large-amplitude period resonant vibration system including the first expansion-phase elasticity ($K_1$) of the first main chamber (23), the second expansion-phase elasticity ($K_2$) of the first sub-chamber (18) and a given equivalent mass of said first orifice passageway means is set at frequency included within an input-vibration frequency range equivalent to the engine shake, wherein a resonance frequency of a first small-amplitude period resonant vibration system including the first expansion-phase elasticity ($K_1$) of the first main chamber (23), the second expansion-phase elasticity ($K_2$) of the first sub-chamber (18), the spring stiffness ($K_4$) of said elastic diaphragm unit (85) and the given equivalent mass of said first orifice passageway means is set at a frequency included within an input-vibration frequency range equivalent to the input vibration during paved-road running, wherein a resonance frequency of a second small-amplitude period resonant vibration system including the first expansion-phase elasticity ($K_1$) of the first main chamber (23), the second expansion-phase elasticity ($K_2$) of the first sub-chamber (18), the spring stiffness ($K_4$) of said elastic diaphragm unit (85) and the given equivalent mass of said second orifice passageway means is set at a frequency included within an input-vibration frequency range equivalent to the idling vibration, and wherein a resonance frequency of a third small-amplitude period resonant vibration system including the first expansion-phase elasticity ($K_1$) of the first main chamber (23), the third expansion-phase elasticity ($K_3$) of the second sub-chamber (19), the spring stiffness ($K_4$) of said elastic diaphragm unit (85) and the given equivalent mass of said third orifice passageway means is set at a frequency included within an input-vibration frequency range equivalent to the high-frequency vibration containing booming-noise and input vibrations during acceleration.

6. A fluid-sealed vibration isolating device as claim in claim 5, wherein said elastic diaphragm unit (85) comprises a circular central thick-walled high-rigidity section (90), an annular intermediate thin-walled low-rigidity section (91) and a cylindrical outermost flanged section (89) formed integral with each other to form an elastic diaphragm, and a support member (63a, 88) securely holding said cylindrical outermost flanged section (89) and having two opposing elastic-deformation restrictive walls spaced apart from said annular intermediate thin-walled low-rigidity section (91) a predetermined space ($d_1$, $d_2$) for permitting elastic deformation of said elastic diaphragm when the amplitude of input vibration is less than the predetermined amplitude, and restricting elastic deformation of said elastic diaphragm when the amplitude of input vibration exceeds the predetermined amplitude.

* * * * *